United States Patent
George et al.

(10) Patent No.: US 8,402,498 B2
(45) Date of Patent: Mar. 19, 2013

(54) METHOD AND APPARATUS FOR CONTROLLING A SET-TOP BOX BASED ON DEVICE EVENTS

(75) Inventors: T. Sahaya George, TamilNadu (IN); Abhishek Malhotra, Saharanpur (IN); Durga Devi Murthy, Chennai (IN); Kaushik Khatua, Kolkata (IN); Sankaran Raman, Chennai (IN); Praveen Prabhaharan, Hosur (IN); Naveen Rosario, Sathuvanchari (IN); Tapan Bansal, Haryana (IN); Naman Patel, Gujarat (IN); Madankanth Lanka, Andhra Pradesh (IN); Varaprasad Meka, Karnataka (IN); Chaitanya Kumar Behara, Andhra Pradesh (IN); Balamuralidhar Maddali, Chennai (IN); Raju Ramakrishnan, Bangalore (IN); Peter Joseph, Kerala (IN); Ashish Phutela, Haryana (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 259 days.

(21) Appl. No.: 12/850,419

(22) Filed: Aug. 4, 2010

(65) Prior Publication Data

US 2012/0036543 A1    Feb. 9, 2012

(51) Int. Cl.
*H04N 7/16* (2011.01)
*H04N 7/173* (2011.01)

(52) U.S. Cl. ......... 725/106; 725/133; 725/141; 725/153

(58) Field of Classification Search .................. 725/106, 725/133, 141, 153
See application file for complete search history.

(56) References Cited

U.S. PATENT DOCUMENTS

| | | | | |
|---|---|---|---|---|
| 2003/0140149 | A1* | 7/2003 | Marejka et al. | 709/229 |
| 2004/0143368 | A1* | 7/2004 | May et al. | 700/241 |
| 2005/0044162 | A1* | 2/2005 | Liang et al. | 709/212 |
| 2006/0041923 | A1* | 2/2006 | McQuaide, Jr. | 725/131 |
| 2008/0075099 | A1* | 3/2008 | Alao et al. | 370/401 |
| 2009/0187956 | A1* | 7/2009 | Sommer | 725/106 |

* cited by examiner

*Primary Examiner* — Hunter B Lonsberry

(57) ABSTRACT

An approach is provided for controlling a set-top box based on a device event. A set-top box detects a wireless device. A communication channel is established with the wireless device configured to initiate a voice call. A command message is received, by the set-top box, over the communication channel. The command corresponds to a device event experienced by the wireless device.

20 Claims, 13 Drawing Sheets

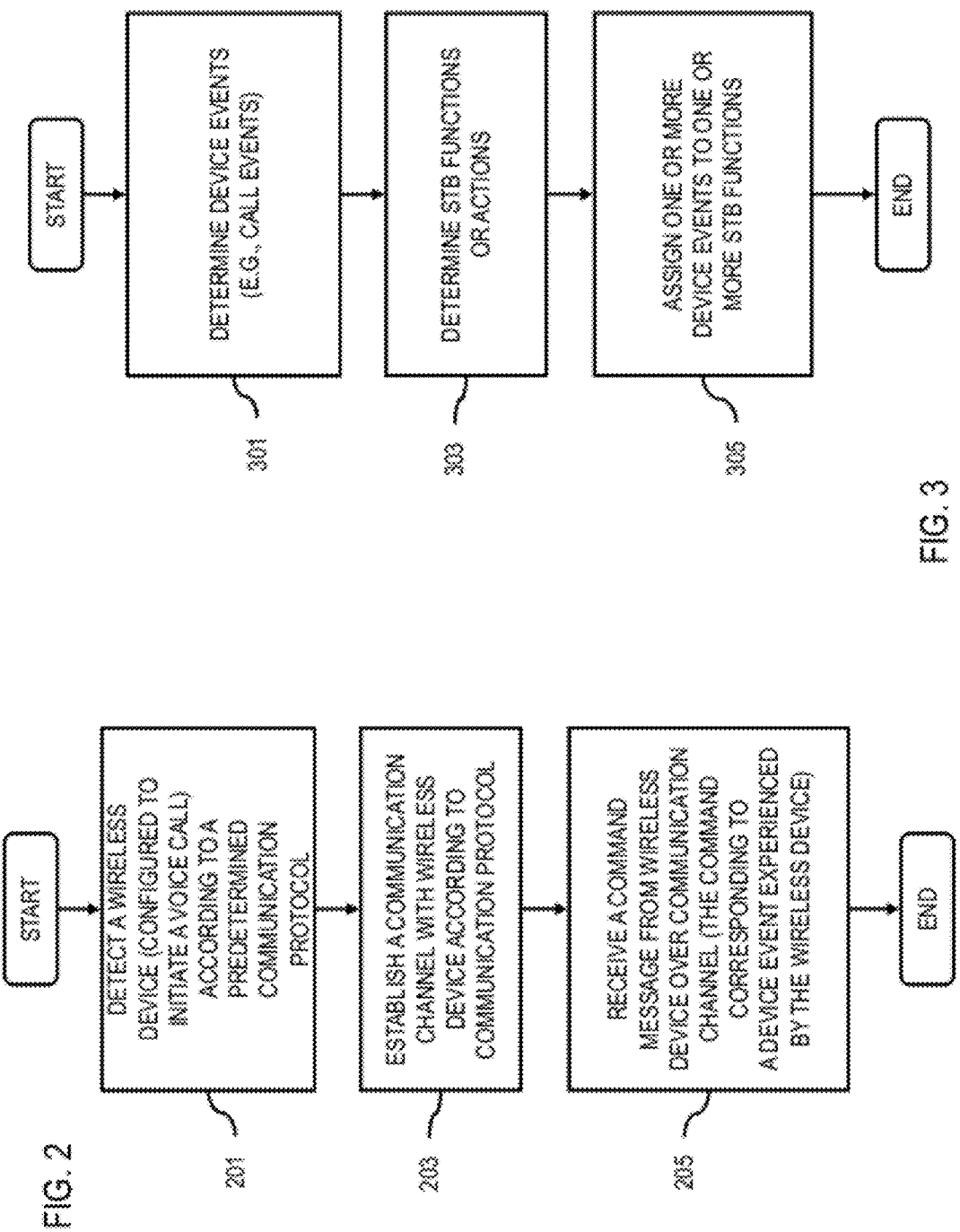

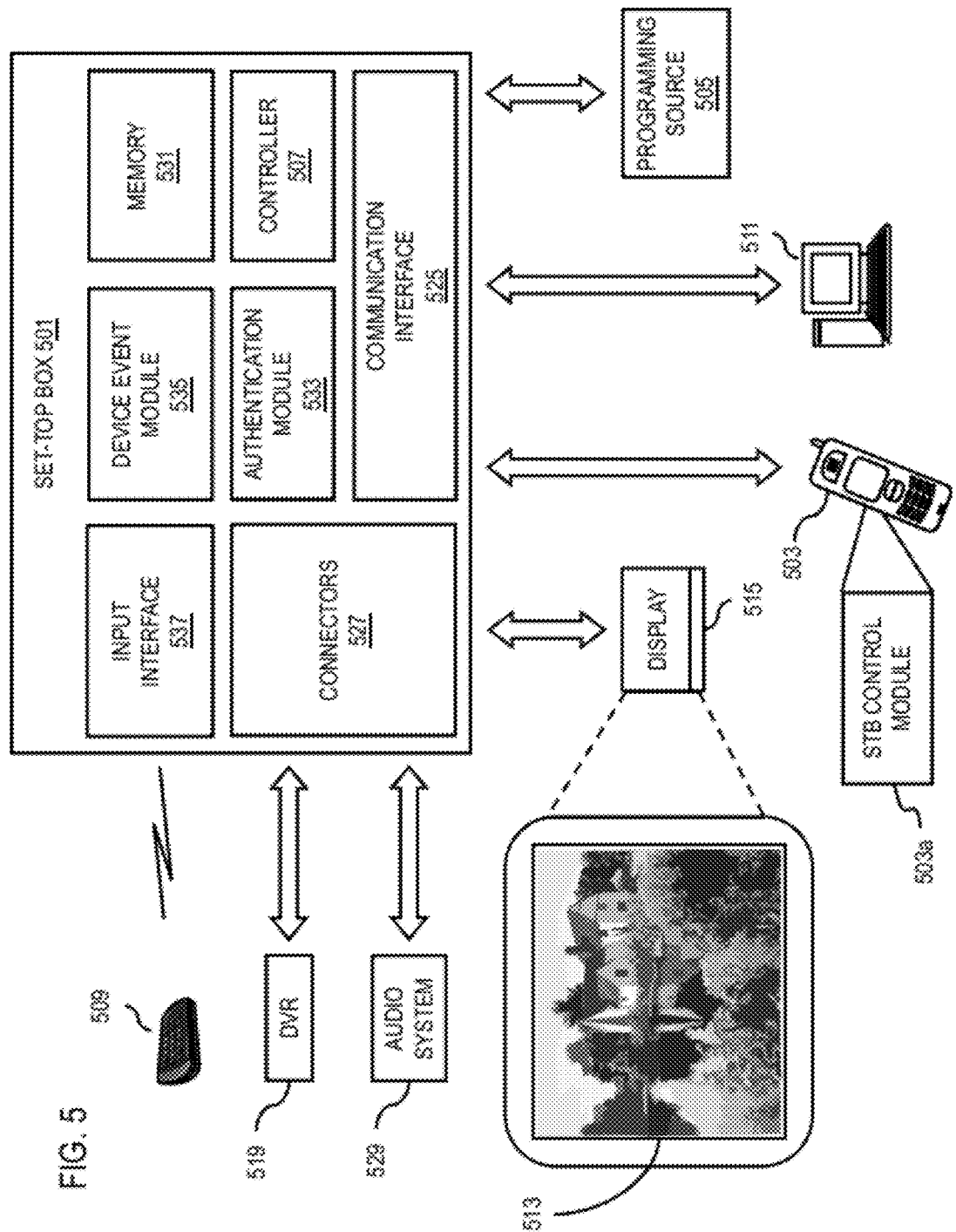

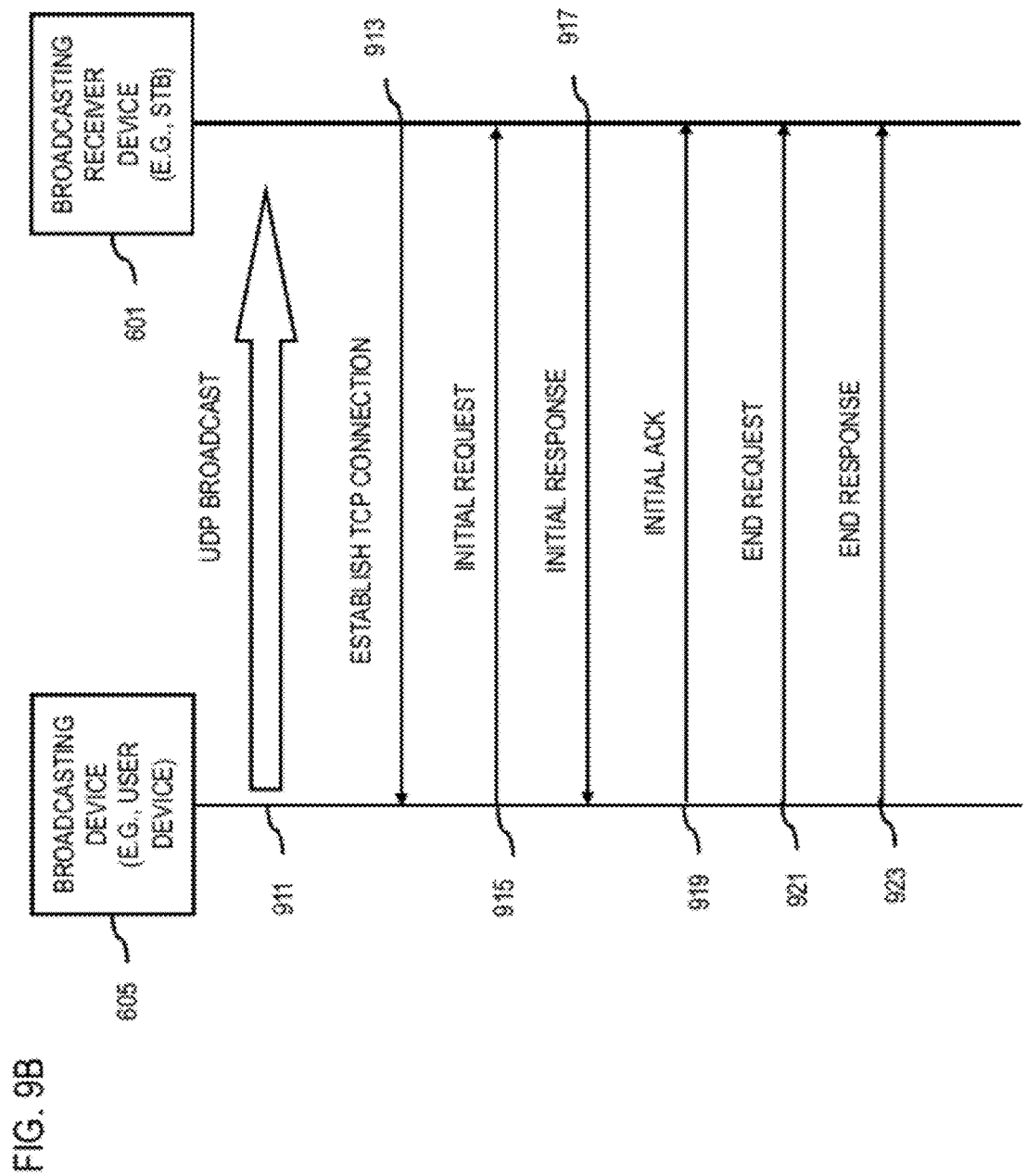

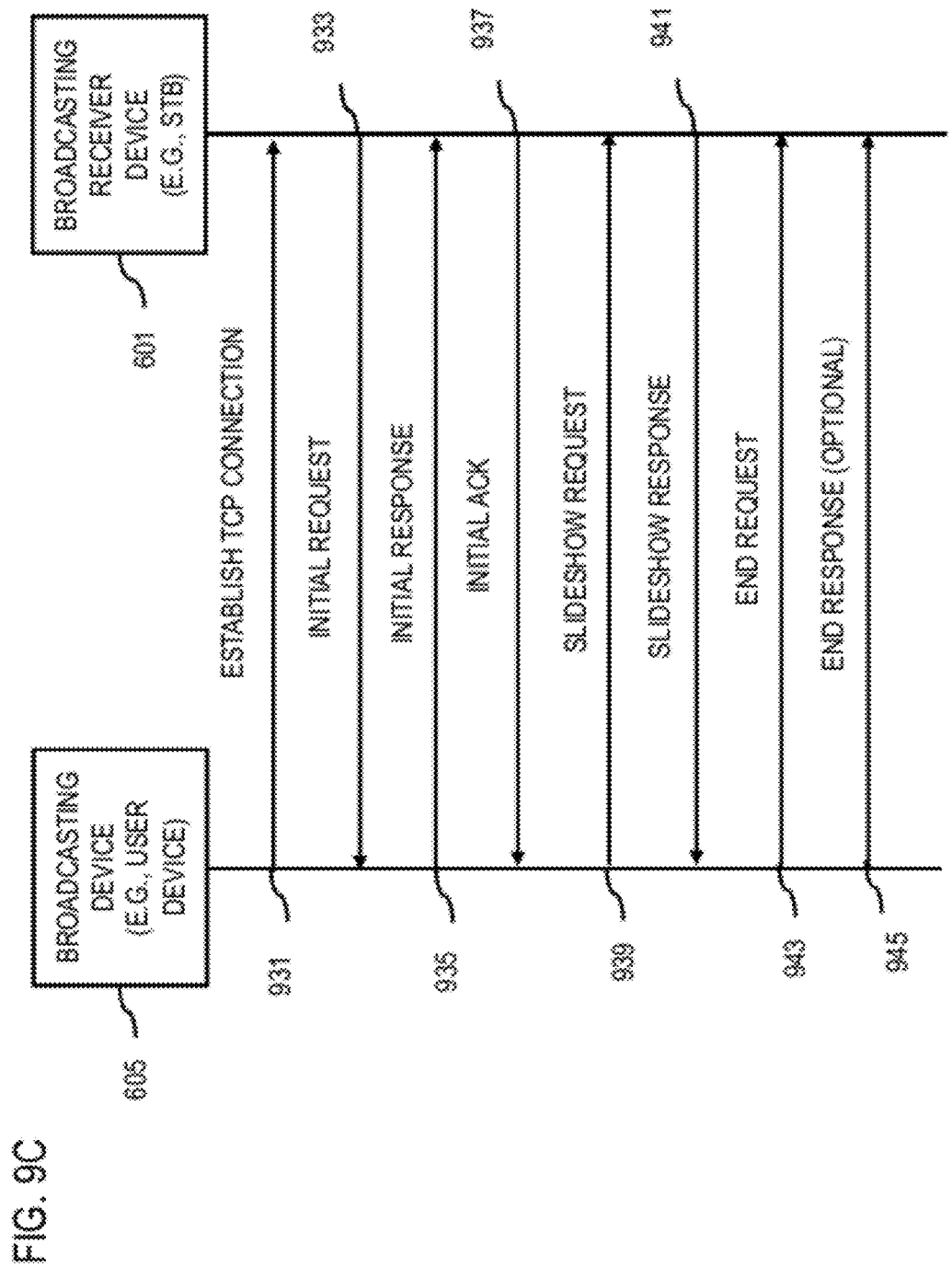

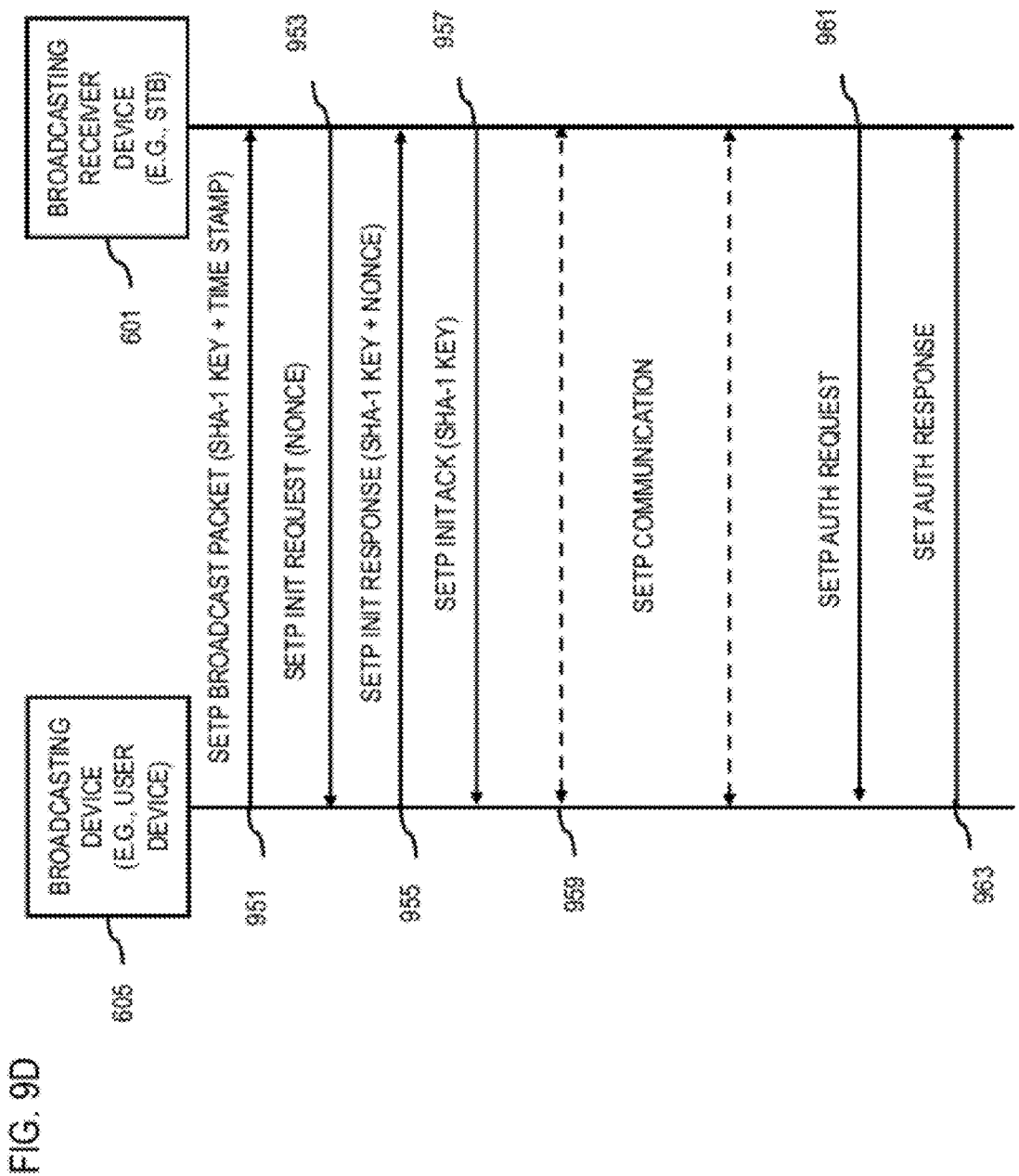

US 8,402,498 B2

METHOD AND APPARATUS FOR CONTROLLING A SET-TOP BOX BASED ON DEVICE EVENTS

BACKGROUND INFORMATION

With the convergence of telecommunications and media services, there is increased competition among service providers to offer more services and features to consumers, and concomitantly develop new revenue sources. For instance, traditional telecommunication companies are entering the arena of media services that have been within the exclusive domain of cable (or satellite) television service providers. Television remains the prevalent global medium for entertainment and information. Concurrently, media services have enjoyed great success in other industries, such as portable media devices (e.g., personal digital assistants (PDAs), MP3 players, mobile phones, etc.), audio streaming services, video streaming, etc. Unfortunately, little or no attention has been paid to the integration of the various mediums to support the seamless sharing and experience of media. Traditionally, television service providers have offered limited user interaction with set-top boxes, other than through a conventional infrared remote controller to control selection of programs. Moreover, users can be engaged in other activities, such as voice communications, etc., or have access to other services during their viewing experiences. However, there has been little or no coordination of the devices that permit participation in these other activities with the set-top boxes. That is, integration of these services have been lacking Therefore, there is a need for an approach to provide coordination between media experience over a set-top box and other telecommunications and media services.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 2 is a flowchart of a process for executing a command for controlling a set-top box in response to a call event, according to an exemplary embodiment;

FIG. 3 is a flowchart of a process for assigning device events to set-top box functions, according to an exemplary embodiment;

FIG. 5 is a diagram of a set-top box configured to be controlled based on device events, according to an exemplary embodiment;

FIGS. 9A-9D are flowcharts of processes for establishing communication between a user device and a set-top box, according to various embodiments;

DESCRIPTION OF THE PREFERRED EMBODIMENT

A preferred apparatus, method, and system for controlling a set-top box based on device events are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a set-top box (STB), it is contemplated that these embodiments have applicability to any device capable of processing audio-video (AV) signals for presentation to a user, such as a home communication terminal (HCT), a digital home communication terminal (DHCT), a stand-alone personal video recorder (PVR), a television set, a digital video disc (DVD) player, a video-enabled phone, an AV-enabled personal digital assistant (PDA), and/or a personal computer (PC), as well as other like technologies and customer premises equipment (CPE). Furthermore, although the STB is explained in the context of call events, it is contemplated that other device events relating to various services and functions are applicable.

Figure 1:
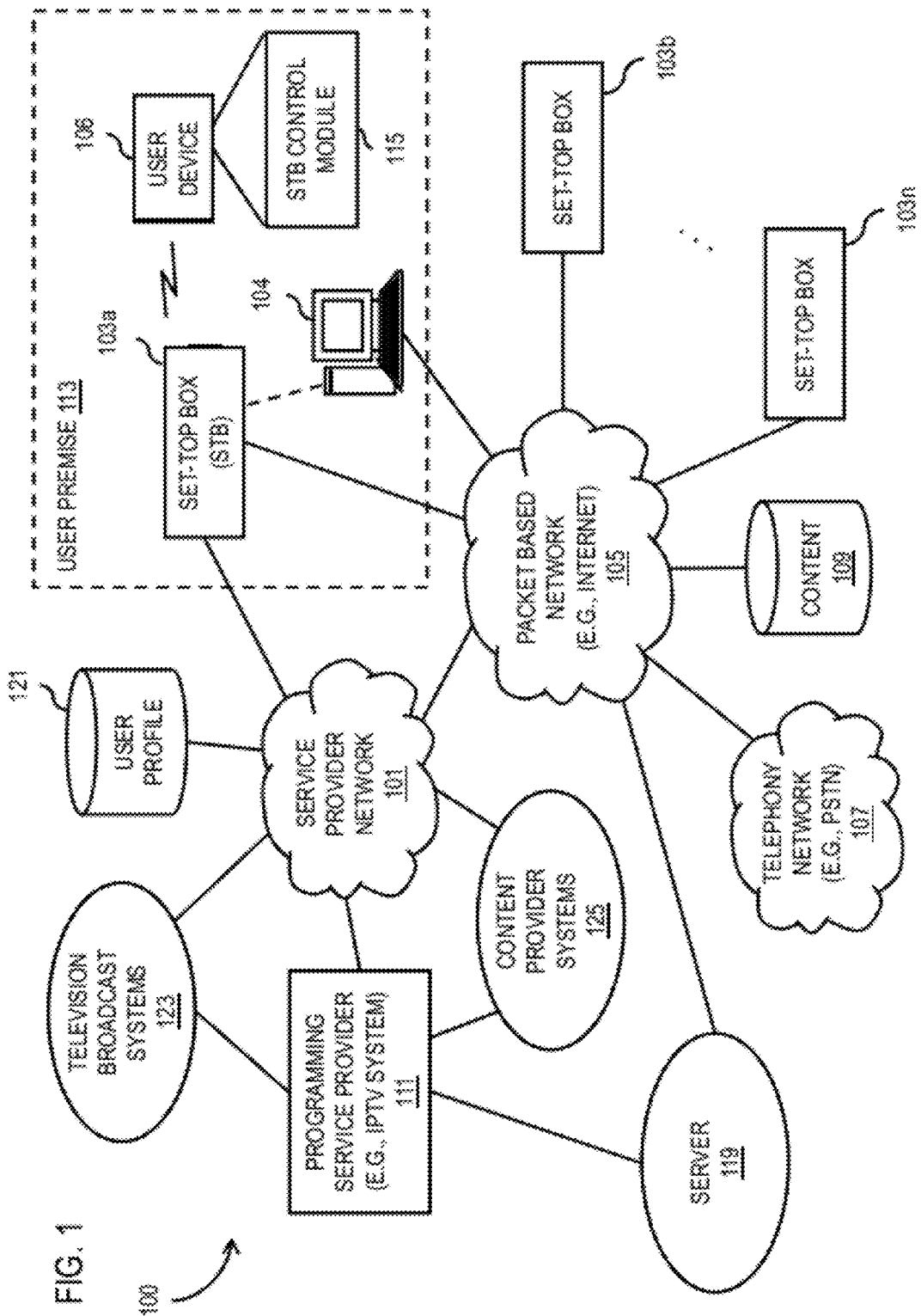
FIG. 1 is a diagram of a system capable of providing control of a set-top box (STB) based on a call event experienced by a user device, according to an exemplary embodiment.

FIG. 1 is a diagram of a system capable of providing control of a set-top box (STB) based on a call event experienced by a user device, according to an exemplary embodiment. It is observed that even with the advent of the Internet and high-speed data connections, television remains the prevalent global medium for entertainment and information. In fact, as traditional television programming (e.g., "over-the-air" programming, cable programming, satellite programming, etc.) merges with the online content (e.g., network-streamed content, on-demand content, Internet programming, media-sharing websites, etc.), the available programming choices are likely to continue to grow without any true bounds. It is also recognized that the versatility of user devices, such as mobile phones equipped with cameras and audio/video players, have resulted in users becoming a prolific source or generator of media. However, no such media convergence is available for user devices, which may contain media that the user has created, purchased, or otherwise accumulated. Such problem stems, in part, from the lack of connectivity between the user devices and set-top boxes. Moreover, there has not been any development regarding the protocol mechanisms to facilitate the convenient and efficient transfer of data. With respect to user devices, such as mobile communication devices (particularly those that support both cellular and wireless networking interfaces), these devices are continually available to support voice communications. As mentioned, no coordination between these devices and set-top boxes exists, and thereby imposing the inconvenience to users of having to manually manipulate the set-top box, for instance, to reduce the volume to properly engage in the voice call.

To address this problem, the system 100 of FIG. 1 enables the control of a set-top box by a user device based on device events. In one embodiment, the user device, e.g., mobile phone, can instruct the set-top box, in response to a device event (e.g., call event, voice command, etc.), to mute the volume. Device events pertain to independent processes and activities of the subject device; that is, the processes are independent of the functions and outputs of the set-top box. For example, device events can include call events, which in certain embodiments include activities relating to the establishment and/or termination of voice communication sessions as well as call features. By way of example, call events can include an incoming call, an off-hook condition, or an on-hook condition. Effectively, the user device can assume the functions of a remote control device for the set-top box, with the additional functionality of integrating call events with these remote control functions. In some embodiments, user device events include detection and/or reception of voice signals. Other device events can comprise actions or activities associated with interactive media, such as audio applications, video applications, gaming applications, etc.

In certain embodiments, the user device may be any type of computer device or mobile device having the capability to support voice communications via software, firmware, and/or hardware. Computer devices may include desktop computers, notebook computers, servers, terminal workstations, gaming systems, customized hardware, or other equivalent apparatus. Mobile devices may include wireless telephones, cellular telephones, satellite telephones, personal digital assistants (PDA), pocket personal computers, smart phones, tablets, handsets, portable gaming systems, and customized hardware, as well as other mobile technologies capable transmitting data.

In the example of FIG. 1, service provider network 101 integrates the television medium with that of the telecommunications, computing, and media environments, thereby broadening the scope of devices and sources available to individuals for obtaining programming content or other media. By way of example, service provider network 101 provides programming content that may include any audio-visual content (e.g., broadcast television programs, digital video recorder (DVR) content, on-demand programs, pay-per-view programs, IPTV (Internet Protocol Television) feeds, DVD related content, etc.), pre-recorded media content, data communication services content (e.g., commercials, advertisements, videos, movies, songs, audio books, etc.), Internet-based content (e.g., streamed video, streamed audio), and/or any other equivalent media form.

STBs 103a-103n and/or terminal 104 can communicate using the packet-based network 105 and/or the telephony network 107. These systems can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, wireless fidelity (Wi-Fi) networks, other wireless networks (e.g., 3G wireless broadband networks, mobile television networks, radio networks, etc.), terrestrial broadcasting networks, provider specific networks (e.g., a Verizon® FiOS® network, a TiVo network, etc.), and the like. Such networks may also utilize any suitable protocol supportive of data communications, e.g., transmission control protocol (TCP), internet protocol (IP), file transfer protocol (FTP), telnet, hypertext transfer protocol (HTTP), asynchronous transfer mode (ATM), socket connections, Ethernet, frame relay, and the like, to connect STBs 103a-103n to various sources of media content. Although depicted in FIG. 1 as separate networks, packet-based network 105 and/or telephony network 107 may be completely or partially contained within service provider network 101. For example, service provider network 101 may include facilities to provide for transport of packet-based and/or telephony communications.

As discussed previously, media or programming content broadly includes any audio-visual content (e.g., broadcast television programs, VOD programs, pay-per-view programs, IPTV feeds, DVD related content, etc.), pre-recorded media content, data communication services content (e.g., commercials, advertisements, videos, movies, songs, images, sounds, etc.), Internet services content (streamed audio, video, or pictographic media), and/or any other equivalent media form. In this manner, the programming service provider 111 may provide (in addition to the provider's own programming content) content obtained from other sources, such as one or more television broadcast systems 123, one or more third-party content provider systems 125, content residing in a repository 109 or accessible via server 119, as well as available via one or more packet-based networks 105 or telephony networks 107, etc.

STBs 103a-103n may be used alone or in combination with one or more end terminal(s) 104 to implement various exemplary embodiments relating to receiving commands that are call event driven from user device 106. Under the scenario of FIG. 1, user premise 113 includes user device 106 and terminal 104. As shown, user device 106 possesses a STB control module 115, which is configured to translate device events into control signals or messages for set-top box 103a to execute. Module 115 can also provide voice recognition capability to convert speech or voice into text data, which is then used to generate an STB command. According to one embodiment, the user can specify the mapping of one or more device events to one or more functions to be performed by STB 103a. It is also contemplated that a particular call event or sequence of device events can trigger a sequence of control functions—e.g., as in a "macro" or script. For example, if an off-hook condition is detected by user device 106, the STB control module 115 can generate a series of commands, for instance, to reduce or mute the volume and pause the program that is being viewed. As will be more fully described later, set-top box 103a can wirelessly (e.g., using Wi-Fi) detect presence of terminal 104 (assuming terminal is so configured to communicate wirelessly) and user device 106 in response to a broadcast message. Thereafter, set-top box 103a can receive instructions or commands from user device 106, as more fully described below with respect to FIGS. 2-4, and 7.

By way of example, STB 103a-103n can remotely access one or more servers (e.g., server 119), via a communication interface (not illustrated), configured to execute one or more applications in support of the call event-based controls. In one embodiment, the call event translation process can be executed by user device 106 solely or in conjunction with STB 103. Alternatively, this translation process can be performed by the STB 103; in which case, information about the call event can be transmitted to the STB 103 with little or no processing by the user device 106. The call event application interacts with user device 106 to interpret the control signals emanating from user device 106. Under this arrangement, the call event application may be provided in a distributed fashion using, for instance, client-server architectures, such as implemented by enterprise application service providers (ASP). It is noted that ASP models (and other like architectures) offer system scalability in terms of administrative scalability, geographic scalability, and/or load scalability. Thus, distributed environments are attractive modes for disseminating system 100 functionality to a broad spectrum of users and devices.

For example, server 119 can be an "online" system capable of communicating with one or more third-party web servers (not illustrated), content repositories (e.g., repository 109), or equivalent facilities, to provide users various avenues to locate, specify, receive, and/or share programming content that is accessible over a data network (e.g., packet-based network 105). For example, exemplary embodiments of media slideshow application may comprise hypertext markup language (HTML) user interfaces or JAVA™ applets stored on server 119 and accessed via world-wide-web pages. These interfaces are particularly useful in extending system 100 functionality to devices having limited resources (e.g., PDAs, handsets, thin-clients, etc.). In alternative embodiments, server 119 is collocated with and/or integrated into programming service provider 111. As such, multiple users, interfaces, and instances of the media slideshow application can be simultaneously realized through system 100.

In the example of FIG. 1, STBs 103a-103n are located at one or more user premises (e.g., user premise 113), and geospatially associated with one or more regions. STBs 103a-103n may be configured to communicate with and receive signals and/or data streams from a programming service provider 111 (or other transmission facility). These signals include results of applying search or browse operations on the available programming content (e.g., video assets) and related date (e.g., programming guide data, metadata) retrieved over a data network (e.g., service provider network 101, packet-based network 105, and/or telephony network 107), as well as conventional video broadcast content.

In one embodiment, a user profile repository 121 may be employed to maintain subscribers to the device event-based STB control service. User profile repository 121 along with content repository 109, or server 119 may be accessed via one or more service provider networks 101 and/or packet-based networks 105. In one embodiment, the user profile repository 121 stores user settings, preferences, and configuration information for the slideshow service. Further, service provider network 101 may include a system administrator (not shown) for operational and management functions to deploy the virtual channel service using, for instance, an internet protocol television (IPTV) system. In this manner, STBs 103a-103n can utilize any suitable technology to draw, receive, and/or transmit media content from/to a programming service provider 111 or other content source/sink. A more detailed explanation of an exemplary STB is provided with respect to FIG. 5.

In an exemplary embodiment, STBs 103a-103n can draw, receive, and/or transmit programming guide information and related content from (or to) multiple sources, thereby alleviating the burden on any single source, e.g., programming service provider 111, to gather, supply, or otherwise meet the content demands of any user or premise. Thus, particular embodiments enable authenticated third-party television broadcast systems 123, third-party content provider systems 125, and servers (e.g., server 119) to transmit programming content accessible over a data network to STBs 103a-103n either apart from, or in conjunction with, programming service provider 111. Such programming content may include content regarding traffic, news, sports, current events, breaking stories, commentary, headlines, advertisements, solicitations, financial advice, stocks, markets, events, schools, governments, blog entries, podcasts, and the like. Moreover, media content may be available from authenticated sources, including grassroots groups or individuals, non-profits, governmental organizations, public/private institutions, etc.

In various embodiments, service provider network 101 may include one or more video and/or audio processing modules (not shown) for acquiring and transmitting programming guide information and related content feeds (including content accessible over a data network) from programming service provider 111, the television broadcast systems 123, the third-party content provider systems 125, or servers 119 over one or more of the networks 101, 105, 107, to particular STBs 103a-103n. Accordingly, service provider network 101 may include facilities to support compression/decompression, coding/decoding, modulation/demodulation, optical/electrical conversion, and analog/digital conversion, as well as any other suitable signal processing and/or transmission operation. Further, service provider network 101 can optionally support end-to-end data encryption in conjunction with programming guide creation and related content streaming services such that only authorized users are able to access personalized programming guides and experience content reference therein.

Moreover, system 100 may include an authentication module (not shown) configured to perform authorization/authentication services and determine whether users or content sources are indeed subscribers to, or providers of, the personalized programming guide service. An authentication schema may require a user name and password, a key access number, a unique machine identifier (e.g., media access control (MAC) address), etc., as well as a combination thereof. Once a subscriber has authenticated a presence on system 100, the user may bypass additional authentication procedures for executing later applications (e.g., programming content streaming instances). Data packets, such as cookies, may be utilized for this purpose. Thus, once an STB or content source is authenticated, connections between the STBs 103a-103n and the content sources may be established directly or through the programming service provider 111.

In other embodiments, authentication procedures on a first device (e.g., STB 103a) may identify and authenticate a second device (e.g., terminal 104) communicatively coupled to, or associated with, the first device. Further, the authentication module may grant users the right to receive programming guide information and related content from multiple system 100 sources by revoking existing sets of digital certificates associated with a particular provider, and issuing new sets of digital certificates mapped to a second provider. In this regard, an STB (e.g., STB 103a) may receive new programming content or guide information from a second source, whereas the previous session may be automatically closed when the "old" or prior certificates associated with the first source are revoked. This enables users to initiate secure sessions at any given STB 103a-103n (or end terminal 104) linked to system 100, whether or not the STB (or end terminal) belongs to that individual user. It is additionally contemplated that multiple rights sessions may exist concurrently.

In particular embodiments, programming service provider 111 may comprise an IPTV system configured to support the transmission of television video programs from the broadcast systems 123 as well as other content, such as content from the various third-party sources (e.g., 109, 119, 123, 125) utilizing internet protocol (IP). That is, the IPTV system 111 may deliver programming guide information, signals and/or streams, including programming content accessible over a data network, in the form of IP packets. Further, the transmission network (e.g., service provider network 101) may optionally support end-to-end data encryption in conjunction with the streaming services, as previously mentioned.

In this manner, the use of IP permits television services to be integrated with broadband Internet services, and thus, share common connections to a user site. Also, IP packets can be more readily manipulated, and therefore, provide users with greater flexibility in terms of control and offers superior methods for increasing the availability of programming guide information and related content. Delivery of video content, by way of example, may be through a multicast from the IPTV system 111 to the STBs 103a-103n. Any individual STB may tune to a particular content source by simply joining a multicast (or unicast) of the media content, utilizing an IP group membership protocol (IGMP). For instance, the IGMP v2 protocol may be employed for joining STBs to new multicast (or unicast) groups. Such a manner of content delivery avoids the need for expensive tuners to view media content, such as television broadcasts; however, other delivery methods, such as directly modulated carriers (e.g., national television systems committee (NTSC), advanced television systems committee (ATSC), quadrature amplitude modulation (QAM)), may still be utilized. It is noted that conventional delivery methods may also be implemented and combined with the advanced methods of system 100. Further, the programming content may be provided to various IP-enabled devices, such as those computing, telephony, and mobile apparatuses previously delineated.

An STB (e.g., STB 103a) may integrate all the functions of an IPTV system, as well as combine the programming content and video asset management functions of the various online or off-line environments. For example, it is contemplated that the personalized programming guide service may be extended to users with a presence on the Internet. In alternative embodiments, the services of system 100 could be extended to users having an end terminal (not shown), such as a plain old telephone service (POTS) device, connected to the telephony network 107. While system 100 is illustrated in FIG. 1, the exemplary components are not intended to be limiting, and indeed, additional or alternative components and/or implementations may be utilized.

Although the user equipment is described with respect to an STB 103, it is contemplated that various embodiments have applicability to any device capable of processing video, audio, and/or multimedia streams.

FIG. 2 is a flowchart of a process for executing a command for controlling a set-top box in response to a call event, according to an exemplary embodiment. Continuing with the example of FIG. 1, set-top box 103a, per step 201, detects a wireless device (e.g., user device 106) according to a predetermined communication protocol. Also, the wireless device 106 can be configured to initiate or process a voice call. According to one embodiment, this protocol is a Simple and Extensible Transmission Protocol (SETP). In general, this protocol can be used to enable communication between two devices. The communication can involve in sending commands, data and events. SETP provides device detection and bonding as well as handling of command messages and data messages. Advantageously, the protocol is designed to be simple, as to accommodate the constraints associated with portable (or mobile) devices; such devices are typically constrained by battery life and processing power.

In step 203, STB 103a establishes a communication channel with user device 106 using the communication protocol. Details of the establishment of the communication channel is provided with respect to FIGS. 9A-9D. Next, set-top box 103a receives a command message, as in step 205, from user device 106 over the established channel. The command, for instance, can be generated based on a device event (e.g., call event) by user device 106. The call event can be an incoming call, which the user wishes to answer. The command can instruct STB 103a to lower or mute the volume, and then to resume the volume level upon a subsequent call event—e.g., termination of the call. Alternatively, the command can be produced based on a voice command from user device 106. In this manner, STB control module 115 may include voice recognition capability to translate speech from a user into, e.g., text, which can then be user to output an appropriate STB command.

As earlier described, device events may be mapped to STB functions, as next explained.

FIG. 3 is a flowchart of a process for assigning device events to set-top box functions, according to an exemplary embodiment. As noted, the mapping or translation of device events (e.g., call events) may be performed by user device 106 or STB 103a. By way of example, the process of FIG. 3 is explained with respect to execution of this process on user device 106. In step 301, the process determines which events are to be selected for controlling the STB 103a. Also, the STB functions or actions can be determined, as in step 303, for mapping with the events; such functions or actions can be specified by the service provider, for example. In step 305, the events are then mapped to the determined STB functions. This mapping between events and STB functions can be one-to-one, one-to-many, or many-to-many.

Figure 4B:
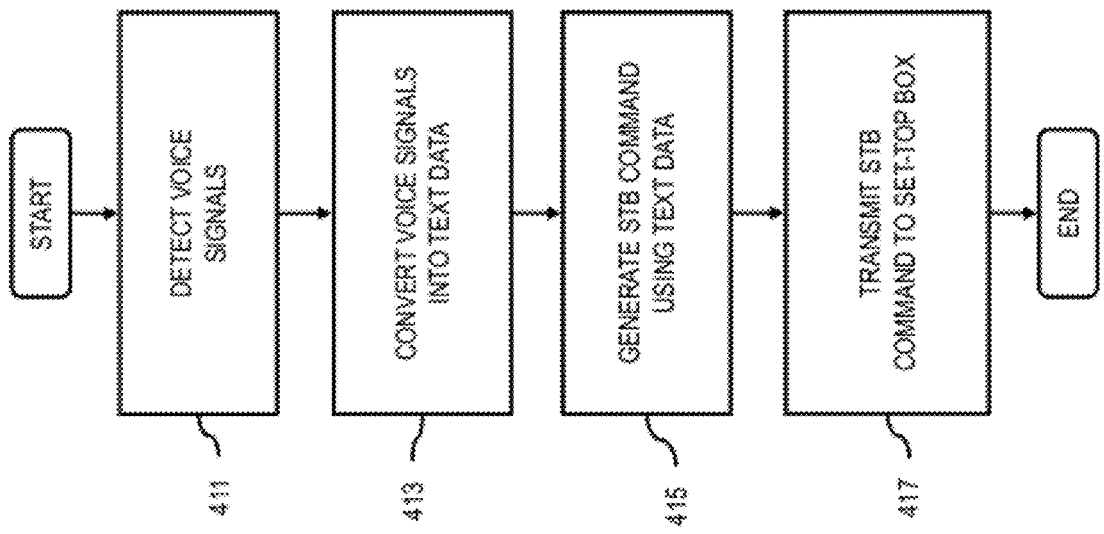
FIGS. 4A and 4B are, respectively, are flowcharts of processes for controlling a set-top box by a user device, according to an exemplary embodiment.
Figure 4A:
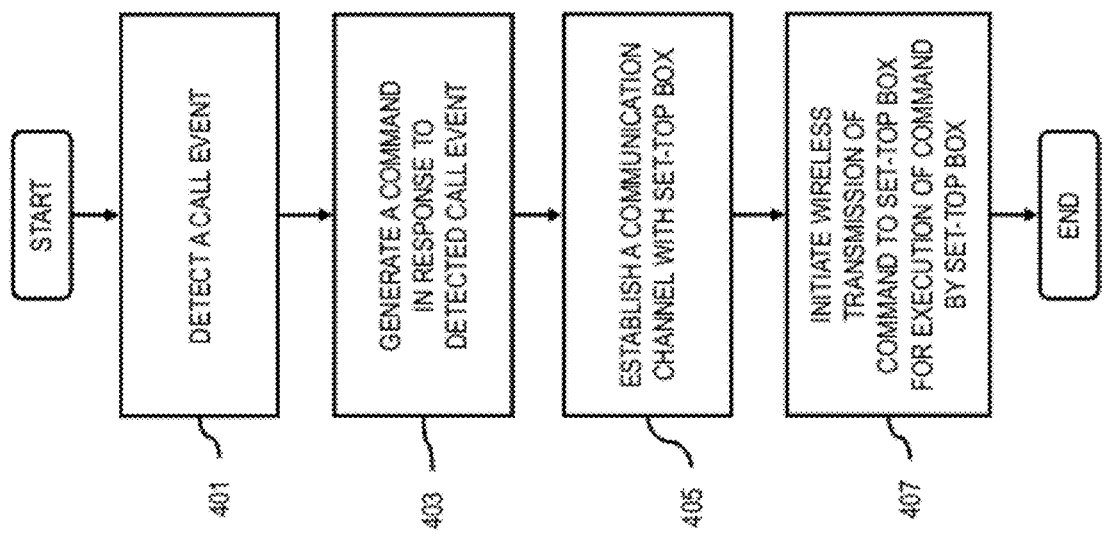

FIGS. 4A and 4B are, respectively, are flowcharts of processes for controlling a set-top box by a user device, according to an exemplary embodiment. The process of FIG. 4A is from the perspective of user device 106, which in this example is a mobile phone experiencing call events. Moreover, it is assumed that the call event translation function is resident within the STB control module 115 of the user device 106. Under this scenario, while a user is viewing a program via STB 103a, a call is received. In step 401, a call event—e.g., an incoming call—is detected by STB control module 115. It is contemplated that in general any device event can be involved; e.g., voice commands (as described with respect to FIG. 4B). Next, the process translates the call event into a command in response to the detected call event, as in step 403. To convey the command to STB 103a, device 106 establishes a communication channel with set-top box 113, per step 405. Thereafter, the command is transmitted wirelessly to STB 103a, per step 407. For example, the command can specify modification of the volume level to permit the user to more easily hear the other party in the voice call. This capability alleviates the need for the user to search out the remote control to mute the volume; such maneuver traditionally would require the user to disrupt the phone conversation (requiring the calling party to wait) so that the volume be reduced. Accordingly, the sound stemming from the media presented by STB 103a need not enter the phone session, thereby interfering with the intelligibility of the telephone discussion; such capability is particularly advantageous if the voice call is of great import; e.g., an emergency call or a business call.

FIG. 4B shows a process involving the user of voice-based STB operation, according to one embodiment. User device 106, in this example, can detect voice signals from a user, as in step 411. These voice signals correspond to speech command from the user; e.g., "turn down volume," "mute," etc. In step 413, STB control module 115 provides speech-to-text to convert the voice signals into text data. The text data can then be used to generate a STB command. By way of example, to generate the command, the process can map the text data to predetermined STB commands. In step 417, the command is transmitted to the STB 103*a* for execution by the STB 103*a*.

FIG. 5 is a diagram of a set-top box configured to be controlled based on device events, according to an exemplary embodiment. STB 501 may utilize any suitable technology to receive media from user device 503 (e.g., mobile phone), as well as one or more content streams from a programming source 505, such as the IPTV system of FIG. 1. In this example, user device 503 includes an STB control module 503*a*.

STB 501 may comprise computing hardware (such as described with respect to FIG. 8) and include additional components configured to provide services related to processing call event driven. In addition, STB 501 includes hardware and/or other components to support related functions and capabilities for viewing video assets (e.g., remote control capabilities, conditional access functions, tuning functions, presentation functions, multiple network interfaces, audio/video signal ports, etc.). As shown in FIG. 5, the functions and operations of STB 501 may be governed by a controller 507 that interacts with each of the STB components to provide programming guide information and related content retrieved from an audio or video-sharing site, as well as from another STB device or component of system 100. In turn, the user may be afforded greater functionality utilizing a control device 509 to control the personalized programming guide service and related services, as will be more fully described below. As later explained, remote control functions can also be provided by mobile phone 503.

STB 501 may be configured to communicate with a number of user devices, including: a PC 511, laptops, PDAs, cellular phones (e.g., device 503), mobile devices, handheld devices, as well as any other equivalent technology capable of capturing and storing media. According to another embodiment, computer 511, as a user device, can also be configured with a slideshow module 511*a* to transfer media 511*b* to STB 501 for presentation to display 515.

As such, STB 501 may be configured to provide an indicator that the STB 501 is being controlled by the mobile unit 505 on (or at) display 515. In one embodiment, presentation of the media (or content) may include: displaying, recording, playing, rewinding, forwarding, toggling, selecting, zooming, or any other processing technique that enables users to manipulate the media. For instance, STB 501 may provide one or more signals to the display 515 (e.g., television) so that the display 515 may present the media, as images, audio, video, or any combination thereof. A communication interface (not illustrated) of PC 511 may be configured to retrieve the programming and content information over the data network (e.g., packet-based network 105), wherein STB 501 may receive a programming content stream from PC 511 to present to the user via display 515.

STB 501 may also interact with a PVR, such as digital video recorder (DVR) 519, to store received content that can then be manipulated by a user at a later point in time. In various embodiments, DVR 519 may be network-based, e.g., included as a part of the service provider network 101, collocated at a subscriber site having connectivity to STB 501, and/or integrated into STB 501.

Furthermore, STB 501 may include a communication interface 525 configured to receive content streams from the programming service provider 111, PC 511, server (not shown), or other programming content source, such as media source 503. Communication interface 525 may optionally include single or multiple port interfaces. For example, STB 501 may establish a broadband connection to multiple sources transmitting content to STB 501 via a single port, whereas in alternative embodiments, multiple ports may be assigned to the one or more sources. In still other embodiments, communication interface 525 may be configured to permit users, via STB 501, to transmit data (including media content) to other users with STBs, a programming service provider 111, or other content source/sink.

According to various embodiments, STB 501 may also include inputs/outputs (e.g., connectors 527) to display 515 and DVR 519, as well as an audio system 529. In particular, audio system 529 may comprise a conventional audio-video receiver capable of monaural or stereo sound, as well as multichannel surround sound. Audio system 529 may include speakers, ear buds, headphones, or any other suitable component configured for personal or public dissemination. As such, STB 501, display 515, DVR 519, and audio system 529, for example, may support high resolution audio and/or video streams, such as high definition television (HDTV) or digital theater systems high definition (DTS-HD) audio. Thus, STB 501 may be configured to encapsulate data into a proper format with required credentials before transmitting onto one or more of the networks of FIG. 1 and de-encapsulate incoming traffic to dispatch data to display 515 and/or audio system 529.

In an exemplary embodiment, display 515 and/or audio system 529 may be configured with internet protocol (IP) capability (i.e., includes an IP stack, or is otherwise network addressable), such that the functions of STB 501 may be assumed by display 515 and/or audio system 529. In this manner, an IP ready, HDTV display or DTS-HD audio system may be directly connected to one or more service provider networks 101, packet-based networks 105, and/or telephony networks 107. Although STB 501, display 515, DVR 519, and audio system 529 are shown separately, it is contemplated that these components may be integrated into a single component, or other combination of components.

An authentication module 533 may be provided at STB 501 to initiate or respond to authentication schemes of, for instance, service provider network 101 or various other content providers, e.g., broadcast television systems 123, third-party content provider systems 125, or servers 119. Authentication module 533 may provide sufficient authentication information, e.g., a user name and password, a key access number, a unique machine identifier (e.g., MAC address), and the like, as well as combinations thereof, to a corresponding network interface for establishing connectivity. As described earlier, one or more digital certificates may be simultaneously mapped. Moreover, authentication at STB 501 may identify and authenticate a second device (e.g., PC 511) communicatively coupled to, or associated with, STB 501, or vice versa. Further, authentication information may be stored locally at memory 531, in a repository (not shown) connected to STB 501, or at a remote repository, e.g., user profile repository 121.

Authentication module 533 may also facilitate the reception of data from single or disparate sources. For instance, STB 501 may receive broadcast video from a first source (e.g., IPTV system 111), signals from a second source (e.g., server 119), and a programming content stream from a third source accessible over a data network (e.g., content repository 109). As such, display 515 may present the broadcast video and programming content stream to the user. This presentation may be experienced separately, concurrently, in a toggled fashion, or with zooming, maximizing, minimizing, or trick capabilities, or equivalent mode.

Connector(s) 527 may provide various physical interfaces to display 515, audio system 529, as well as other peripherals; the physical interfaces may include, for example, RJ45, RJ11, high definition multimedia interface (HDMI), optical, coax, FireWire, wireless, and universal serial bus (USB), or any other suitable connector. The presentation module 535 may also interact with a control device 509 for determining particular media content that a user desires to experience. In an exemplary embodiment, the control device 509 may comprise a remote control (or other access device having control capability, such as a PC 511, wireless device, mobile phone, etc.) that provides a user with the ability to readily manipulate and dynamically change parameters affecting the device event-based STB control service. In other examples, STB 501 may be configured for voice recognition such that STB 501 may be controlled with spoken utterances.

In addition to the user device 503 being configured to control the manner in which STB 501 behaves in response to device events, STB 501 may also permit control device 509 to activate and deactivate the device event-based STB control service. In this manner, control device 509 may include (not shown) a cursor controller, trackball, touch screen, touch pad, keyboard, and/or a key pad for activating a slideshow application, selecting programming content, as well as performing other control functions. Control device 509 may also include functional actuators (e.g., buttons, keys, icons, etc.), such as power on/of, play, pause, stop, fast-forward, reverse, volume up/down, channel up/down, menu, ok/enter, record, info, my content, search, edit, or exit, as well as any other suitable control trigger, such as alphanumeric buttons, shift, control, back, symbols, and the like.

Further, the control device 509 may comprise a memory (not illustrated) for storing preferences relating the device event-based STB control service; such preferences can be conveyed to STB 501 through an input interface 537. The input interface 537 may support any type of wired and/or wireless link, e.g., infrared, radio frequency (RF), BLUETOOTH™, and the like. Thus, control device 509 may store user preferences with respect to the parameters associated with the device event-based STB control service. Alternatively, user preferences may be tracked, recorded, or stored in STB 501 or in a network user profile repository 121. The preferences may be automatically retrieved and activated by a user at any time. It is noted that the control device 509 may be separate from STB 501 or may be integrated within STB 501 (in which case certain input interface hardware and/or software may not be necessary).

Particular embodiments enable users, via control device 509, to populate or otherwise configure a user profile. For instance, a user profile application may be provided or accessed by STB 501 to enable users to populate a plurality of entry fields with user information. A user profile may include one or more customized or personalized settings relating to the slideshow application, as well as other content and applications. More specifically, the profile may include: subscription information (account number, user name, password, avatar, moniker, etc.), subscriber demographics (age, gender, ethnicity, location of residence, zip code, school district, community, socioeconomic status, religion, marital status, ownerships, languages, mobility, life cycles, etc.), group/organizational affiliations (e.g., political), memberships, interests, buddies, friends, cohorts, system configurations, policies, associated users/devices, etc., as well as any other like personal information. Additionally, a user profile may include a "whitelist" specifying one or more accessible programming content sources/subjects, a "blacklist" specifying one or more programming content sources/subjects, as well as other equivalent customized settings, such as color schemes, sound effects, etc.

Thus, under the above arrangements of FIG. 5, a mobile phone 503 can conveniently integrate call functions to permit control of STB 519 during a voice call.

Figure 6:
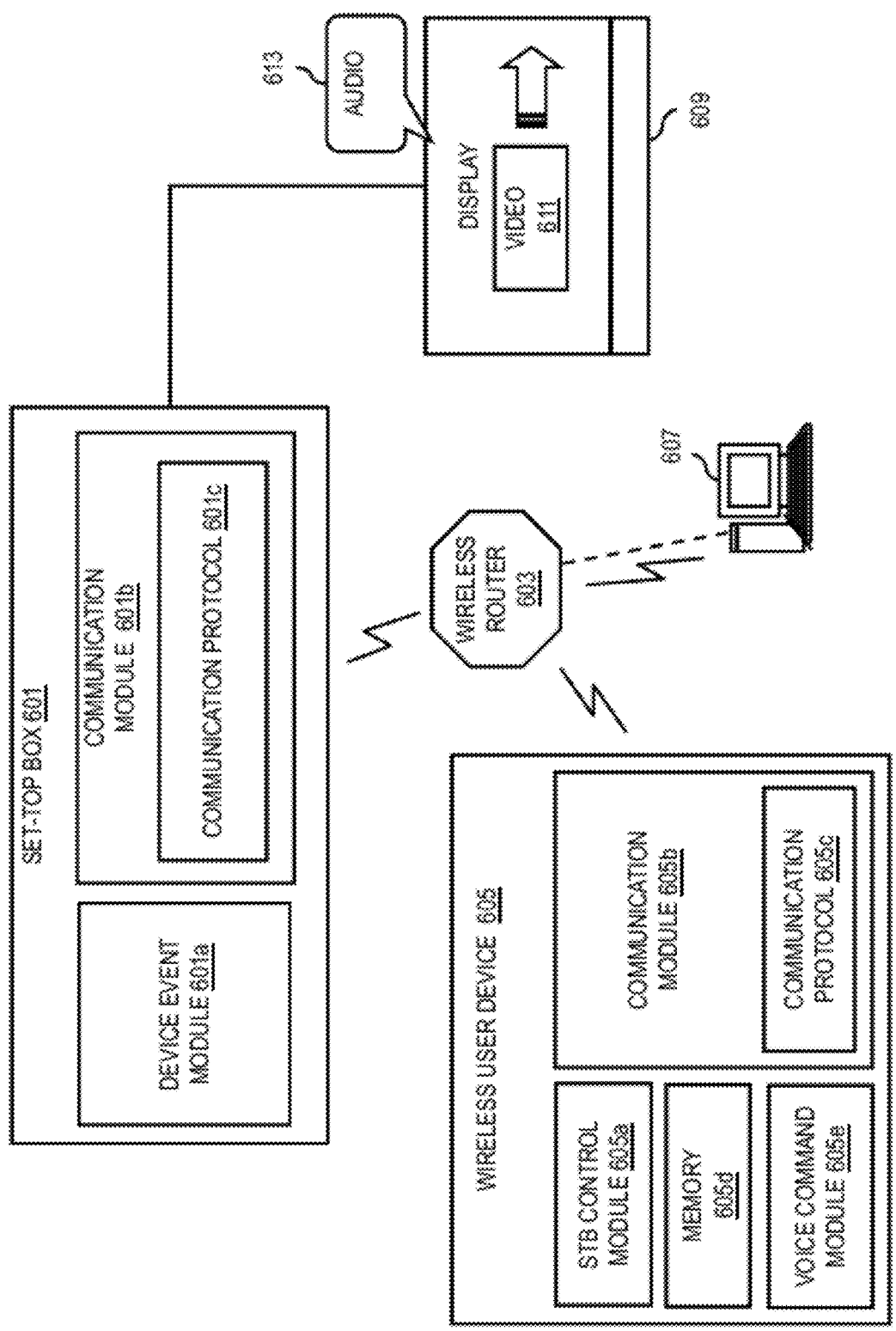
FIG. 6 is a diagram of a wireless environment in which a user device and a set-top box interact to provide control of the set-top box based on device events, according to an exemplary embodiment.

FIG. 6 is a diagram of a wireless environment in which a user device and a set-top box interact to provide control of the set-top box based on call events, according to an exemplary embodiment. In this example, STB 601 operates within a wireless local area network (LAN) through the use of a wireless router 603, using Wi-Fi. The router 603 provides connectivity among a wireless user device 605 (e.g., mobile phone with Wi-Fi capability, PDA, etc.) and a computer device 607.

This arrangement can enable use of a mobile phone, for example, as a remote control device for the computer 607 and set-top box 601. Such an environment can support devices that are Wi-Fi enabled; alternatively, wired connections can be utilized—e.g., an Ethernet cable from computer device 607 to router 603, either directly or through another network component such as a hub.

STB 601 includes a device event module 601a configured to operate with a communication module 601b to permit wireless user device 605 and computer device 607 to process control signals related to device events, such as call events or application events. As shown, STB 601 outputs to a display 609. In one embodiment, device event module 601a receives commands from wireless user device 605; the commands are generated in response to one or more call events, which are processed by STB control module 605a. Device event module 601 a, among other functions, is responsible for "listening" to incoming requests devices 605, 607, and to determine whether devices 605, 607 are authorized to control STB 601. Although not shown, terminal 607 may also include a STB control module for generating control signals to STB 601 in response to call events associated with, for instance, a packetized voice call. The authorization procedure is more fully described with respect to FIGS. 9A and 9D.

Additionally, user device 605 includes communication module 605b (executing a communication protocol 605c), and memory 605d configured to store media, such as images and audio files.

Furthermore, a voice command module 605e provides conversion (or translation) and recognition of speech (utterances) from the user for controlling STB 601 to perform certain actions. These actions relate to various STB functions, e.g., channel control, volume control, muting, search, etc. Module 605e can execute, in one embodiment, a voice-to-text (or speech-to-text) application to text data, which is then used to create an STB command.

To coordinate the processing of call events, user device 605 and STB 601 employ communication protocol 605c and 601c, respectively, to create a communication channel for transport of data messages as well as command (or control) messages. As more fully described below, the communication protocol can utilize transport protocols, such as Transmission Control Protocol (TCP) or User Datagram Protocol (UDP) over Internet Protocol (IP). As shown, upon execution of a command stemming from a call event, presentation of video 611 and audio 613 can be altered, for example, for the duration of a voice call, and restored upon completion of the call.

Figure 7:
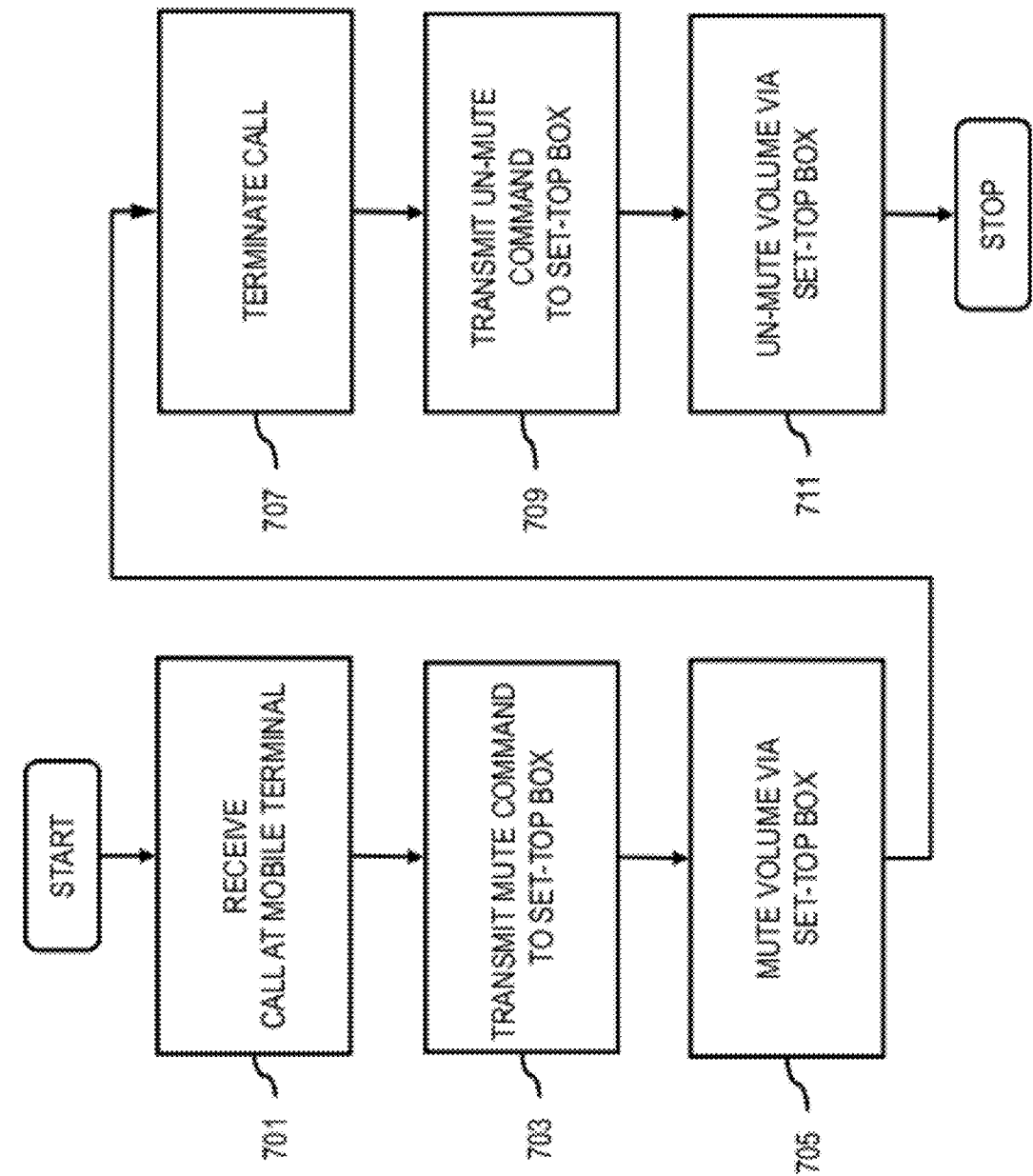
FIG. 7 is a flowchart of a process for muting a STB via a wireless user device, according to an exemplary embodiment.

FIG. 7 is a flowchart of a process for muting a STB via a wireless user device, according to an exemplary embodiment. For the purposes of illustration, this process is described with respect to FIG. 6 involving a voice call. When a call is received at wireless user device 605, thereby involving an "incoming call" call event, device 605 automatically (without user input or involvement) transmits a mute command to the STB 601 (per steps 701 and 703). In one embodiment, STB 601 invokes a mute function, thereby lowering the volume level to a predetermined level, as in step 705. Once the call is terminated (step 707), the mobile device 605 transmits an un-mute command to the STB 103, which correspondingly un-mutes STB 601, per steps 709 and 711, to restore the volume level that was set prior to the voice call.

As described previously, the call event can trigger other actions, in addition to muting the volume, such as pausing of the program; under this embodiment, the call event is mapped to multiple actions to be performed by STB 601.

The above process of FIG. 7 involves the interaction among STB 601 and user devices 605 and 607 using a predetermined protocol that is optimized for the exchange of information in the context of controlling STB 601. According to certain embodiments, the protocol is termed Simple and Extensible Transmission Protocol (SETP), as next detailed.

Figure 8A:
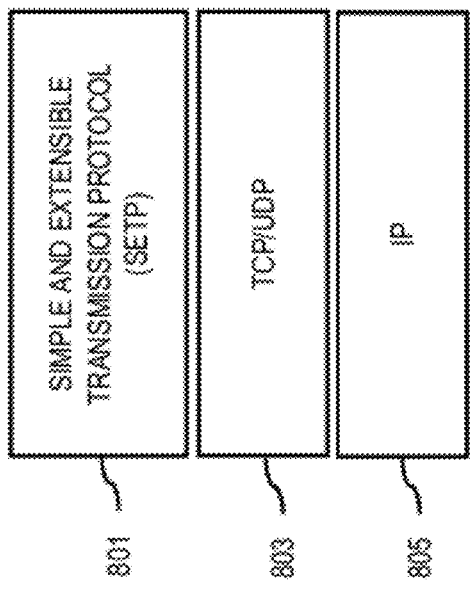
FIGS. 8A and 8B are diagrams of a communication protocol and associated messaging formats for controlling STB functions based on device events, according to various embodiments.
Figure 8B:
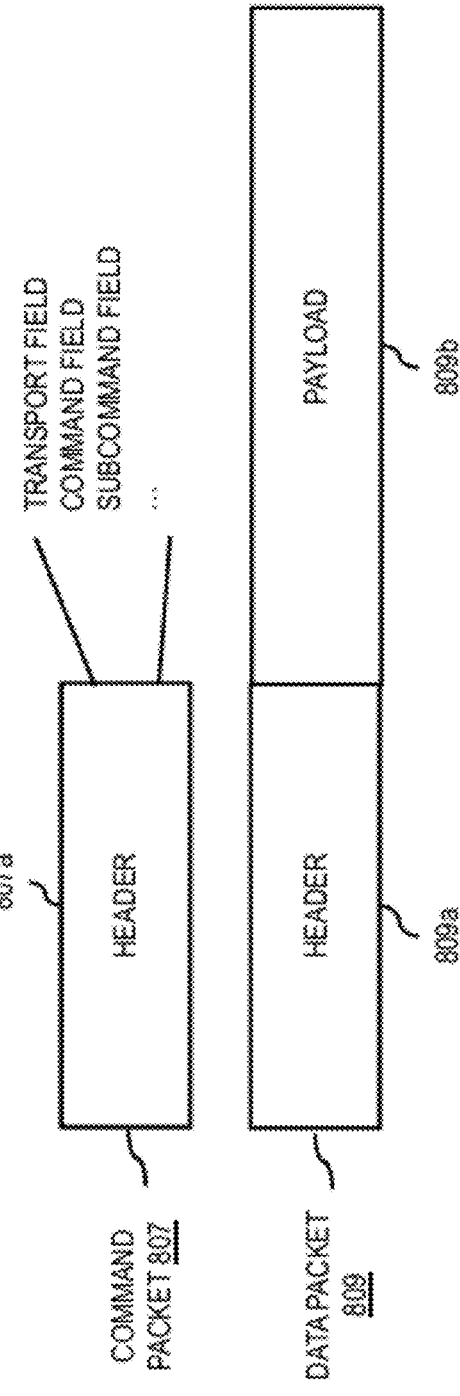

FIGS. 8A and 8B are diagrams of a communication protocol and associated messaging formats for controlling STB functions based on device events, according to various embodiments. As shown in FIG. 8A, in certain embodiments, a Simple and Extensible Transmission Protocol (SETP) 801 rests above a Transmission Control Protocol (TCP) or User Datagram Protocol (UDP) layer 803. Also, the Internet Protocol (IP) 805 can be utilized. These protocols 801-805 can configured to operate in a variety of wireless transport environments. For the purposes of illustration, the SETP 801 is explained with respect to a Wi-Fi environment.

In one embodiment, SETP 801 is a binary protocol that resides within the application layer (of the Open System Interconnect (OSI) model). SETP 801 can be used to send various commands and command related information along with command data. SETP 801 utilizes predefined command headers, thereby advantageously requiring less processing time. Also, this protocol is efficient as the commands are pre defined and the decoding can be simple. Further, SETP 801 is fast, in that the processing of the commands follow different logical branches for different commands.

As mentioned, SETP 801 can be configured to support different transport mechanisms. For instance, the addition of new transport mechanisms and associated commands can be readily accommodated. The commands and data to be transferred are secure in that SETP 801 is session based. Accordingly, passwords are never "sent out through wire"; consequently, the password need not be changed frequently.

SETP 801 can be used to build different applications. Although SETP 801 is primarily described herein for the communication between STBs and user devices, SETP 801 can also be used to communicate between any other applications/devices/PCs to transfer commands and data.

As depicted in FIG. 8B, a command message (or referred to as command packet in the case of IP) 807 includes only a header. A data message (data packet) includes a header 809a and a payload 809b.

The SETP header structure 809a includes 70 bytes. This header is used to carry all the commands, data and events. Table 1 below enumerates the fields in the header, according to certain embodiments.

TABLE 1

Protocol ID (1 Unsigned Byte)
Protocol Version (1 Unsigned Byte)
Protocol Subversion (1 Unsigned Byte)
Transport (1 Unsigned Byte)
Command (2 Unsigned Bytes)
Command Sequence (1 Unsigned Byte)
Time stamp (4 Unsigned Byte)
Proxy Info (6 Unsigned Byte)
From Info (6 Unsigned Byte)

TABLE 1-continued

To Info (6 Unsigned Byte)
Auth Info (32 Unsigned Byte)
Sub Command (1 Unsigned Byte)
Flags (2 Unsigned Bytes)
Reserved (2 Unsigned Byte)
Payload Length (4 Unsigned Byte)

The Protocol Identifier (ID) field identifies the particular message or packet. For example, the Protocol Identifier can be defined as 'V' such that all packets associated with this protocol should have the ID as 'V'. Also, a Protocol Version field can be provided to denote the major version of the protocol. This major version can be changed either for a major functionality change or if the protocol subversion reaches a predetermined limit. The Protocol Subversion field specifies the sub version of the protocol. For every new addition, alteration and modification of this draft requires either this field's increment or the version field's increment.

Transport field denotes the transport mechanism used by the protocol to communicate with other devices, as SETP is designed to accommodate different transports; e.g., TCP over Wi-Fi, and the UDP over the Wi-Fi (the values are specified in Table 2):

TABLE 2

SETP_TRANSPORT_WIFITCP = 1
SETP_TRANSPORT_WIFIUDP = 2

A Command field identifies the command carried by the protocol. Also, a Command Sequence field denotes the sequence number of the packet sent. For instance, the sequence can start from 0 to 255. Once the value reaches 255, the sequence of the next packet will be 1. By way of example, the sequence number is zero for new commands. This sequence increases if a command/data packet sends its continuation packet.

A Time Stamp field specifies the timestamp of the packet generated. This field can be based on GMT (Greenwich Mean Time) time zone. In one embodiment, for the continuation packets, the timestamp can be the same as the initial packet. The Time Stamp field can be used to combine the divided data packets of the same command.

A Proxy Info field specifies the IP address of the proxy. For the protocol supported in this version, this field is set as the IP address of the endpoint device. This field is particularly useful when TCP and UDP are employed.

A From Info field has the IP address of the packet originator. Also, a To Info field is provided to specify the information of the destination.

An Auth Info field indicates the Session ID established through the initial hand shaking.

A Sub Command field is provide to specify any additional information about the command. The values of this Sub Command field can be interpreted differently for different commands.

SEPT 801 also provides fields for flags, which can include two bytes to be used to specify the bit level information about the packet. The defined bit values are given below in Table 3:

TABLE 3

| Bit Position (From most significant bit) | Description if set |
|---|---|
| 1 | Denotes Originator |
| 2 | It has the continuing packets |
| 3 | It is the continuing packet |
| 4 | If this command is the proprietary |
| 5 | If this device starts the TCP channel first |
| 6 | Denotes big endian |

A Reserved field is provided for future development.

A Payload Length field indicates the length of the payload of the command packet. If this field is zero, for instance, the packet is recognized as a command packet 807. If this field is not zero and carries some information, this packet is recognized as a data packet 809. If stream oriented protocols are used as the transport, the next immediate length bytes are read and appended as the payload of this packet. There need not be any constraint on format or the manner in which the payload is manipulated and handled. However, the payload data can be specified in the name, length and value pair, for example. In this manner, SETP 801 can accommodate different proprietary headers and different objects at the same time.

Regarding command packets and data packets (shown in FIG. 8B), as mentioned, packets that have only headers are defined as command packets. If the packet has both the header and payload data, these packets are designated as data packets. According to some embodiments, the payload of the data packets follow the NLV (Name, Length and Value order) structure. Table 4 lists exemplary header names and codes:

TABLE 4

| Name value (1 unsigned byte) | Description |
|---|---|
| 0 | End indicator |
| 1 | Contains "Name" |
| 2 | Type |
| 3 | Content or data |
| 4 | Algorithm |
| 5 | Nonce key |
| 6 | Key Limit |
| 7 | Key |
| 8 | IP |
| 9 | Port |
| 10 | Transport |
| 11 | Session support |
| 12 | Transport Support |
| 13 | Media Support |
| 14 | Length Support |
| 15 | Session Init Time |
| 16 | Session Validity |
| 17 | Max payload support |
| 18 | Binary data model (Big/Little endian) |
| 19 | ID |
| 20 | Size |
| 21 | MAC |

Table 5 provides common subcommands in the responses:

TABLE 5

| Sub Command | Description |
|---|---|
| 1 | OK |
| 2 | NOT_AUTHORIZED |
| 3 | NOT_AUTHENTICATED |
| 4 | FILETYPE_NOT_SUPPORTED |
| 5 | VERSION_NOT_SUPPORTED |
| 6 | TRANSPORT_NOT_SUPPORTED |
| 7 | GENERAL_ERROR |
| 8 | ERROR_PROCESSING_REQUEST |
| 9 | COMMAND_NOT_SUPPORTED |
| 10 | SUBCOMMAND_NOT_SUPPORTED |
| 11 | NOT_AVAILABLE |
| 12 | INVALID_HEADER |
| 13 | INVALID_PAYLOAD |

By way of example, the commands that are supported by SETP 801 fall into two categories: (1) authenticated commands, and (2) unauthenticated commands. The authenticated commands are the commands can be used only after the authentication, while the unauthenticated commands can be used in both authenticated and unauthenticated sessions.

In addition, SETP 801 utilizes a Broadcast field to specify broadcasting commands: SETPhd —COMMAND_ BROADCAST=1.

Regarding the payload 809*b*, a payload that is sent during the initial handshaking negotiation is denoted as "the resource capability payload." In certain embodiments, there are nine headers that are defined in this payload. These headers are followed in the name, length and value combination, as shown in Table 6.

TABLE 6

| Description | Name (1 Unsigned Byte) | Length (2 unsigned Bytes) | Value |
|---|---|---|---|
| Binary Data Model(1 - Little Endian 2 - Big Endian) | 18 | 1 | 2 |
| Algorithm (Any SHA family algorithms can be used) | 4 | 1 | 1 (denotes SHA-1) |
| Nonce value | 5 | 1 | 0 (use the time stamp from the command header) |
| Key Limit (To denote the range of keys sent from the keys generated) | 6 | 4 | First 2 bytes denotes "starts from". Second 2 bytes denotes "ends with". 0 for the first byte and 31 for the second byte |
| Key (It combines the "user id + password + nonce" and makes it as a single string. Then the SHA-1 algorithm will be applied to this header to get the 32 bit key. This key will be sent in this field.) | 7 | 32 | Holds the key generated |
| IP | 8 | 6 bytes | 0 (Means the IP will be taken from the IP packet's header) |
| Port | 9 | 2 | Port Number |
| Transport Preference | 10 | 1 | 1 (to denote the TCP over Wi-Fi preference for the communication) |
| Display Name | 1 | Length of the "display name" | Optional Display name (Ex, "SoftRemote") |

In SETP 801, an Init Session command is used for authorization, and specifies a payload according to the cabablities that are supported. This Init Session command requires a response, which in turn, requires an acknowledgement (INIT ACK). If the validation fails, the connection is closed. The values of the command are as follows in Table 7:

TABLE 7

SETP_COMMAND_INITREQUEST = 3
SETP_COMMAND_INITRESPONSE = 4

For example, in the INIT ACK, the command is '4' and the sub command is '1'. The payload is defined according to Table 8:

TABLE 8

| Description | Name (1 Unsigned Byte) | Length (2 unsigned Bytes) | Value |
|---|---|---|---|
| Binary Data Model | 18 | 1 | 2 |
| Display Name | 1 | Length of the name value | |
| Algorithm (1 - SHA-1) | 4 | 1 | 1 |
| Nonce key | 5 | 1 | 0 (use the time stamp from the command header) |
| Key Limit | 6 | 4 | First 2 bytes denotes "starts from". Second 2 bytes denotes "ends with". 0 for the first byte and 31 for the second byte |
| Generated Key (This NLV is send only with the hand shaking response and acknowledgement) | 7 | 32 | |
| Session support | 11 | 4 | |
| Transport Support | 12 | 2 | |
| Media Support | 13 | 4 | |
| Length Support | 14 | 4 | |
| Session Init Time | 15 | 6 | |
| Session Validity | 16 | 4 | Validity time in sec. (Once this validation time is over, it can challenge the other end using the 'Authenticate request') |
| Max Payload Support | 17 | 4 | |

SETP 801 also defines an End Session command, which is used to close/stop the session (e.g., SETP_COMMAND_ENDREQUEST=5). The response is not mandatory for this command.

Further, a Cancel Transfer command is provided for aborting a file transfer. No subcommand or payload is needed. An example of such command is as follows: SETP_COMMAND_CANCELTRANSFERREQUEST=11.

A Channel Change Command relates to changing a channel. This command, according to one embodiment, as an associated response; an example is as follows: SETP_COMMAND_CHANNELCHANGEREQUEST=17. If the requested channel is not found, the response can indicate a sub command of '11'. An exemplary payload is provided below in Table 9:

TABLE 9

| Description | Name (1 Unsigned Byte) | Length (2 unsigned Bytes) | Value |
|---|---|---|---|
| Channel ID | 19 | 4 | |
| Channel Name | 1 | Length of Name | |

A File Display Command is supplied to send a file for display by the receiver. This command has an associated response, which indicates status of the file display. The payload, as detailed in Table 10, can be sent in multiple packets, whereby all the continuation packets only have the File content NLV. Such command is as follows: SETP_COMMAND_FILEDISPLAYREQUEST=19.

TABLE 10

| Description | Name | Length | Value |
|---|---|---|---|
| File Name | 1 | Length of the file name given in the value | Actual file name |
| File Type | 2 | 2 | File type in the bit representation |
| File Size | 20 | 4 | Total file size |
| File Content | 3 | Length of the content | Content of the file |

SETP 801 also provides a GTP Payload command, which is used to transfer the GTP content. In one embodiment, a response is mandatory for this command (e.g., SETP_COMMAND_GTPREQUEST=21). Table 11 enumerates the sub commands:

TABLE 11

ERROR = 0
CATG_REQ = 1
CATG_RES = 2
CH_REQ = 3
CH_RES = 4
PI_REQ = 5
PI_RES = 6
PD_REQ = 7
PD_RES = 8

A Search Command accommodates a generalized search; such command is as follows: SETP_COMMAND_SEARCHREQUEST=23. Table 12 shows the associated sub commands.

TABLE 12

SEARCH_START = 1
SEARCH_STOP = 2
SEARCH_KEYDATA = 3
SEARCH_DATA = 4
SEARCH_RESET = 5

To initiate a search, a 'search start' command is sent. Each and every key that is inputted is transmitted as key data. Also, a 'search stop' command specified to end the search. Table 13 provides an exemplary payload:

TABLE 13

| Description | Name | Length | Value |
|---|---|---|---|
| Data | 3 | Length of the data in case of 'data'. '1' in case of the 'key data'. | value to be searched. |

A General Response command is provided to alert the other device about some general predefined responses. No payload need be specified. This command (e.g., SETP_COMMAND_GENERALRESPONSE=25) can be sent as a response for any request. Table 14 lists the sub commands:

TABLE 14

OK = 1
NOT_AUTHORIZED = 2
NOT_AUTHENTICATED = 3
FILETYPE_NOT_SUPPORTED = 4
VERSION_NOT_SUPPORTED = 5
TRANSPORT_NOT_SUPPORTED = 6
GENERAL_ERROR = 7
ERROR_PROCESSING_REQUEST = 8
COMMAND_NOT_SUPPORTED = 9
SUBCOMMAND_NOT_SUPPORTED = 10
NOT_AVAILABLE = 11

An Authenticate Request command permits the other device to authenticate itself (for the nonce value provided by the device). This request has a response; if the response is not proper, the session is closed. The latest key generated will be used as the Session ID for the remaining session. The command and response are as follows:

SETP_COMMAND_AUTHENTICATEREQUEST = 27
SETP_COMMAND_AUTHENTICATERESPONSE = 28

The payload is listed in Table 15:

TABLE 15

| Description | Name | Length | Value |
|---|---|---|---|
| Algorithm (1 - SHA-1) | 4 | 1 | 1 |
| Nonce key | 5 | 1 | 0 (use the time stamp from the command header) |
| Key Limit | 6 | 4 | First 2 bytes denotes "starts from". Second 2 bytes denotes "ends with". 0 for the first byte and 31 for the second byte |
| Generated Key (This NLV is send only with the hand shaking response and acknowledgement) | 7 | 32 | |

A Remote Control Command is provided for sending the remote control keys to the receiving side. A response this type of command is not needed. An example of the Remote Control Command is SETP_COMMAND_REMOTECONTROLREQUEST=29. Table 16 shows the sub commands:

TABLE 16

RC_KEY_POWER = 0
RC_KEY_MUTE = 1
RC_DEVICEKEY_STB = 2
RC_DEVICEKEY_AUX = 3
RC_DEVICEKEY_DVD = 4
RC_DEVICEKEY_TV = 5
RC_KEY_MENU = 6
RC_KEY_GUIDE = 7
RC_KEY_INFO = 8
RC_CONTROL_UP = 9
RC_CONTROL_DOWN = 10
RC_CONTROL_LEFT = 11
RC_CONTROL_RIGHT = 12
RC_CONTROL_OK = 13
RC_KEY_EXIT = 14
RC_KEY_OPTIONS = 15
RC_KEY_WIDGETS = 16
RC_KEY_ONDEMAND = 16
RC_KEY_FAVOURITES = 17
RC_KEY_JUMP = 18
RC_KEY_FIOSTV = 19
RC_KEY_CHANNELUP = 20
RC_KEY_CHANNELDOWN = 21
RC_KEY_VOLUMEUP = 22
RC_KEY_VOLUMEDOWN = 23
RC_KEY_SKIPBACK = 24
RC_KEY_SKIPFORWARD = 25
RC_KEY_DVR = 26
RC_KEY_PLAY = 27
RC_KEY_STOP = 28
RC_KEY_PAUSE = 29
RC_KEY_FORWARD = 30
RC_KEY_BACKWARD = 31
RC_KEY_REC = 32
RC_KEY_1 = 33
RC_KEY_2 = 34
RC_KEY_3 = 35
RC_KEY_4 = 36
RC_KEY_5 = 37
RC_KEY_6 = 38
RC_KEY_7 = 39
RC_KEY_8 = 40
RC_KEY_9 = 41
RC_KEY_0 = 42
RC_KEY_ASTERISK = 43
RC_KEY_HASH = 44
RC_CONTROLKEY_A = 45
RC_CONTROLKEY_B = 46
RC_CONTROLKEY_C = 47
RC_CONTROLKEY_D = 48
RC_KEY_INPUT = 49
RC_KEY_PIP = 50
RC_KEY_PIPCHANGE = 51

SETP 801 further provides a SlideShow command. According to certain embodiments, this command specifies the beginning and ending of the slide show. Also, the command can notify the receiving device of slide show related events. An example of this command is as follows: SETP_COMMAND_SLIDESHOWREQUEST=31. Table 17 lists the associated sub commands:

TABLE 17

SLIDESHOW_START = 1
SLIDESHOW_STOP = 2
SLIDESHOW_PAUSE = 3
SLIDESHOW_RESUME = 4

A Device Info Request command permits the sending (or source) device a way to obtain device information of the receiving device (or destination).

Table 18 lists the commands:

TABLE 18

SETP_COMMAND_DEVICEINFOREQUEST = 33
SETP_COMMAND_DEVICEINFORESPONSE = 34

Table 19 lists the associated payload.

TABLE 19

| Description | Name | Length | Value |
|---|---|---|---|
| Display Name | 1 | Length of the Name | |
| Mac Address | 21 | 6 | |

FIGS. 9A-9D are flowcharts of processes for establishing communication between a user device and a set-top box, according to various embodiments. By way of example, these processes associated with SETP 801 are explained with respect to the system of FIG. 6, wherein communication is established between a user device 605 and set-top box 501.

Figure 9A:
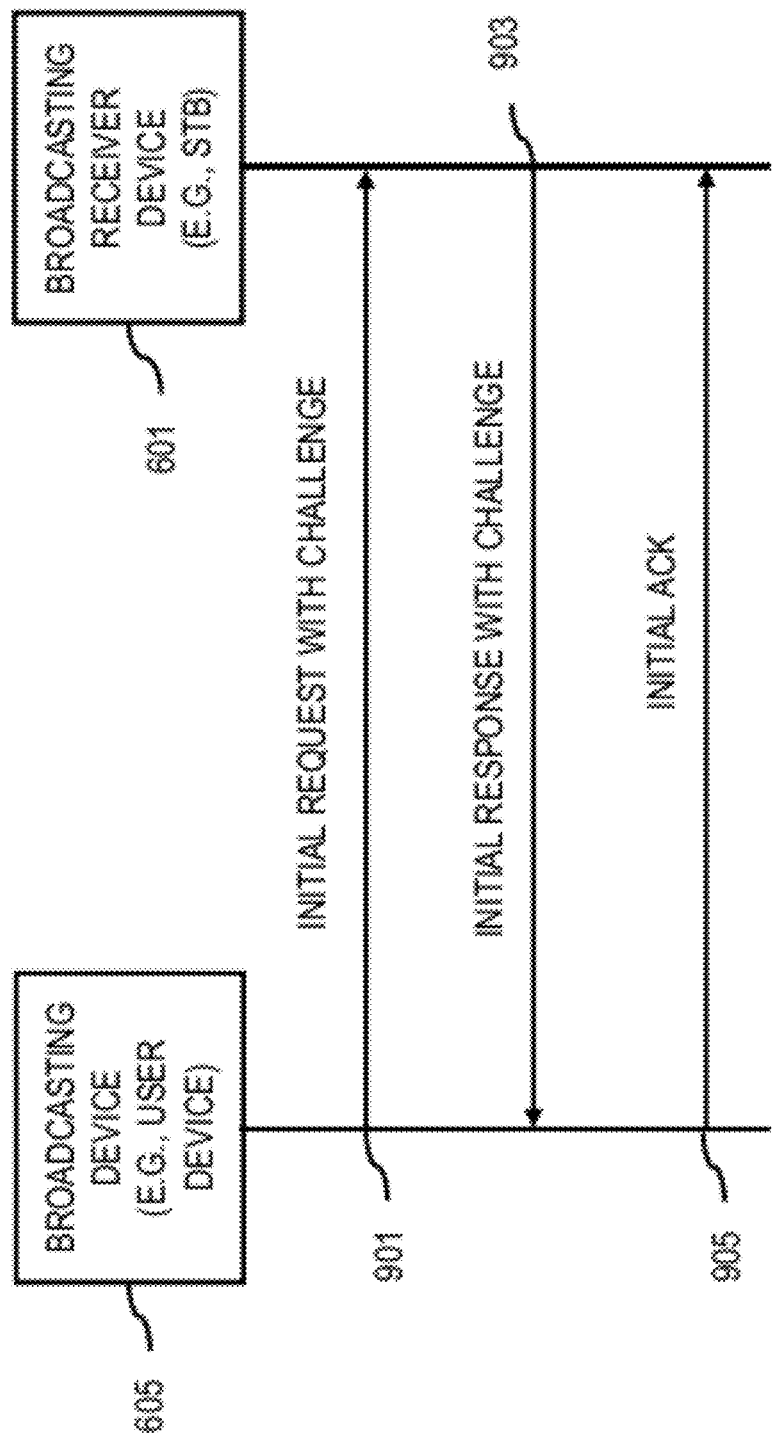

FIG. 9A shows a ladder diagram of a handshaking mechanism that is supported by SETP 801. In this example, user device 605 and STB 601 are assigned a User ID and password (or passcode); the assignment of these credentials can be managed by a service provider according to one embodiment. Under this scenario, the devices 601, 605 can communicate if both of their credentials are same. In this manner, it would be apparent that the user is common to user device 605 and STB 601. According to certain embodiments, a key is generated from the User ID and password (e.g., a personal identification number (PIN)) will be sent as part of broadcast packets. Under this arrangement, there is flexibility for interested devices to establish a communication channel with the broadcasting device.

As shown, user device 605 is referred to as a "broadcasting device," while STB 601 is the "broadcasting receiver device." For instance, when the broadcast receiver 601 decides to communicate with the broadcasting device 605, the receiver 601 establishes a communication channel (e.g., TCP session or channel) with the broadcasting device 605. If the connection is not authenticated using, for example, an initial hand shaking within a predetermined period (e.g., 120 seconds) of the connection being opened, the connection is closed. When the connection is accepted by device 605, device 605 challenges with the initial hand shaking request. Thus, in step 901, user device 605 generates a request with challenge for transmission to STB 601. In turn, the broadcasting receiver device 601 can submit a response along with the challenge, per step 903. Upon receiving the response, device 605 can send an acknowledgement message (ACK) to positively indicate successful receipt of the response (step 905). Once this procedure is completed, the session is secured. The challenge response can be used as the Session ID for the entire session.

In one embodiment, the common (or least) capabilities transmitted during the above hand shaking negotiation process can be used as the session capability for the whole session. If the session capability rules are violated by any command, such rules can be responded with a "Not Supported" response.

According to certain embodiments, all the further communications between device 501 and device 605 will be conducted over this TCP channel in the case of TCP transport. If the TCP connection is broken, the described authentication procedure is performed again for the new communication channel. That is, on successful handshake, both the originator and terminator devices can maintain the TCP channel for the whole session. This TCP channel can be closed and opened at any point of time during the communication. Each re-opening of communication channel requires the described handshaking mechanism to be performed for the authentication. The command and data packets (which were described above) can be sent through this established channel. The connection will be closed if the authentication or authorization fails. Also, an established communication channel can be closed by sending a session close command; however, closing the TCP channel can also terminate this session.

FIG. 9B shows a process for detecting a user device, according to one embodiment. In step 911, user device 605 generates a message, e.g., UDP broadcast message, for transmission to STB 601. SETP 801, in certain embodiments, provides for binding and listening on predetermined port for both the TCP and UDP packets. The device that does not want to be detected need not start a UDP server. Similarly in the case in which a device does not want to support the detection mechanism (and only wants to be an originator all the time), such device also need not start the TCP server. If a device wants to support the detection mechanism (and only wants to be the terminator), the particular device need not start the TCP server, but needs to start the UDP server.

The terminator (STB 601 in this example) can listen on the same port for both the TCP and UDP packets. When an originating device wants to detect other SETP responders, such device generates the UDP broadcasting packets. Upon detection of this broadcast message, STB 601 initiates establishment of a TCP connection (per step 913), using the handshaking procedure of FIG. 9A (as in steps 915-910). Hence, by receiving this broadcasting packet, the receiving device 501 (terminator) can establish a TCP communication channel with device 605.

In this example, user device 605 submits an End Request message to STB 601, per step 921. Also, user device 605 sends an End Response message, as in step 923, to STB 601.

FIG. 9C depicts a process for sending commands using SETP 801, according to one embodiment. For the purposes of illustration, the command relates to presentation of a slideshow by STB 601. As with the process of FIG. 9B, a communication channel (e.g., TCP connection) is established using the handshaking mechanism of FIG. 9A, per steps 931-937. Thereafter, user device 605, as in step 939, generates and sends a slideshow request to STB 601, which replies with a slideshow response (step 941). This exchange can involve parameters for starting, stopping, pausing, and/or resuming the media presentation via STB 601. In steps 943 and 945, user device 605 submits an end request and an optional end response to terminate the session.

FIG. 9D illustrates a signaling flow for authenticating a user device using SETP 801, according to one embodiment. This example addresses how SETP 801 ensures session security and data security. In certain embodiments, the SHA family of algorithms (SHA-1) is employed by SETP 801 for the encryption. As seen, an initial "SETP BROADCAST" packet is sent, per step 951, by user device 605. The BROADCAST packet carries a SHA-1 key and a nonce value as its payload. The SHA-1 key is generated using the combination of the User ID, password and the nonce value (time stamp generated during the packet generation). For example, if the User ID is "51234567890", the password is "ABCD" and the time stamp is "987654321", the combined string "51234567890ABCD987654321" is formed. The resultant string is used as an input to generate the SHA-1 key.

The terminating device, STB 601, receives this BROADCAST packet and extracts the SHA key and the nonce value.

Since STB 601 also is aware of the User ID and password, STB 601 generates the SHA key using the nonce value (extracted from the BROADCAST packet) sent by the originator. If the resultant SHA key generated by the terminator is the same as the one received from the originator 605, a TCP communication channel can be established with originator, user device 605.

In step 953, STB 601 accepts the TCP connection, and challenges user device 605 with the SETP INIT REQUEST. This request, for example, includes a nonce value as a payload. Once device 605 receives this INIT REQUEST, device 605 generates the SHA key using the User ID, password and the nonce value (received from the terminator 601). User device 605 challenges STB 601 with a nonce value and with the SHA key through the SETP INIT RESPONSE, per step 955.

When STB 601 receives this INIT RESPONSE, STB 601 extracts the nonce value and the SHA from the INIT RESPONSE. STB 601 then responds to the challenge by generating the SHA key and sends the key through the SETP INIT ACK, per step 957.

As both STB 601 and user device 605 successfully responded to the challenges, now they are paired and can communicate. According to one embodiment, to ensure the communication channel is secure, set-top box 605 can periodically challenge user device 605 through a SETP AUTH REQUEST and appropriate SET AUTH RESPONSE (steps 961 and 963). If any of the entity fails to respond the challenges successfully, the communication channel will be closed.

The described processes and arrangement advantageously enables automatic control of set-top boxes in response to device events experienced by a user device, e.g., mobile phone. In certain embodiments, the communication between the user device and STB is facilitated by a simple and extensible transmission protocol.

The processes described herein for providing set-top box control may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
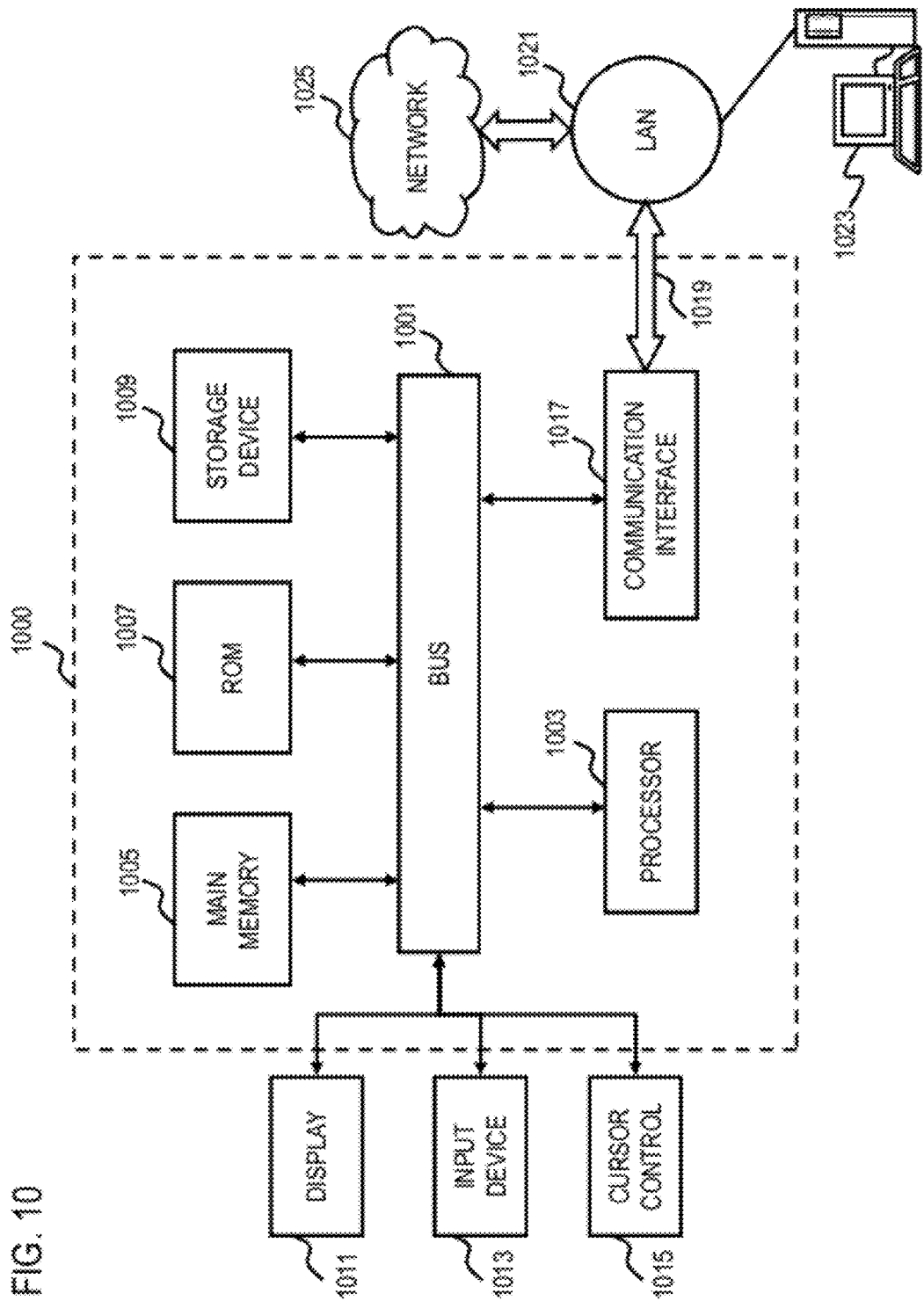
FIG. 10 is a diagram of a computer system that can be used to implement various exemplary embodiments.

FIG. 10 illustrates computing hardware (e.g., computer system) upon which an embodiment according to the invention can be implemented. The computer system 1000 includes a bus 1001 or other communication mechanism for communicating information and a processor 1003 coupled to the bus 1001 for processing information. The computer system 1000 also includes main memory 1005, such as random access memory (RAM) or other dynamic storage device, coupled to the bus 1001 for storing information and instructions to be executed by the processor 1003. Main memory 1005 also can be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to an embodiment of the invention, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement the embodiment of the invention. Thus, embodiments of the invention are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an embodiment of the invention through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 11:
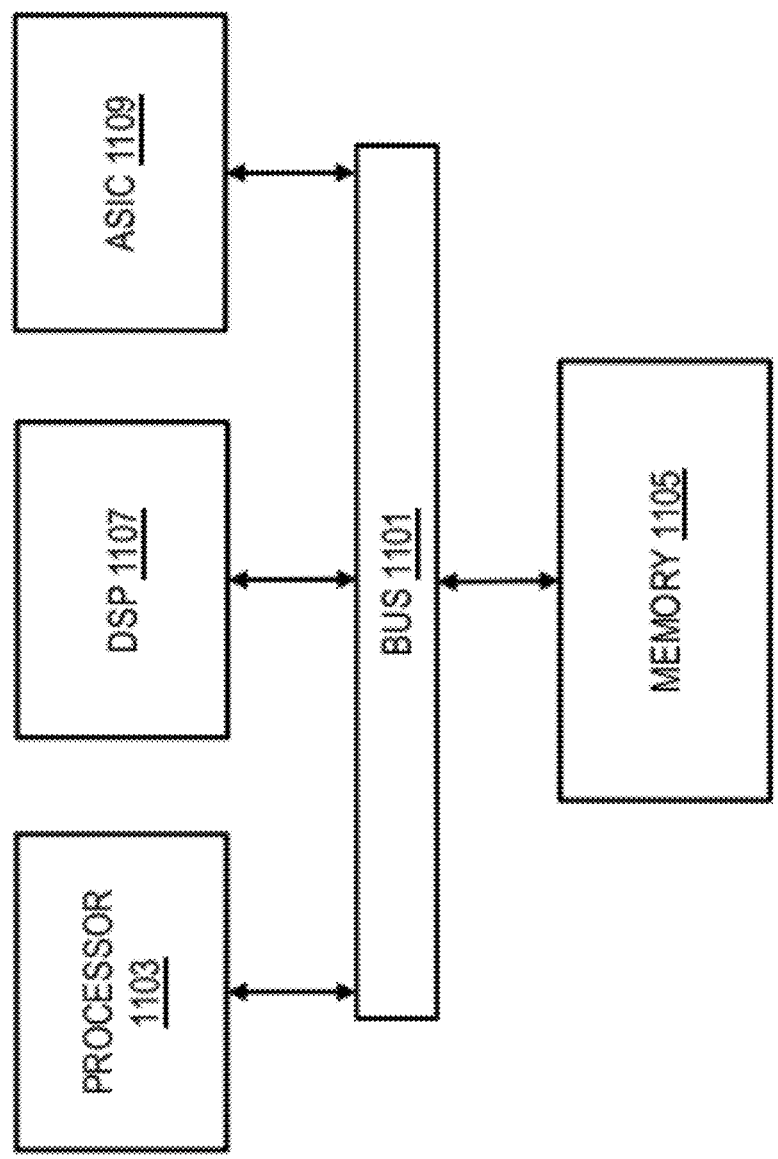
FIG. 11 is a diagram of a chip set that can be used to implement various exemplary embodiments.

FIG. 11 illustrates a chip set 1100 upon which an embodiment of the invention may be implemented. Chip set 1100 is programmed to present a slideshow as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1100, or a portion thereof, constitutes a means for performing one or more steps of FIGS. 2-4, 7, and 9A-9D.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 1105 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    detecting, at a set-top box, a wireless device configured to initiate a voice call;
    establishing, by the set-top box, a communication channel with the wireless device; and
    receiving, by the set-top box, a command over the communication channel, the command corresponding to a device event experienced by the wireless device;
    wherein the steps of detecting, establishing, and receiving are performed according to a communication protocol including a command packet that specifies a predefined header of a fixed length and a payload of variable length, wherein, the command includes only the predefined header with a payload length of zero to indicate that the type of packet is a command packet and the command includes a payload length greater than zero to indicate that the type of packet is a data packet.

2. A method according to claim 1, wherein the device event includes a call event, the method further comprising:
    assigning the call event to one or more commands for controlling the set-top box.

3. A method according to claim 1, further comprising:
    assigning a plurality of the commands to the device event.

4. A method according to claim 1, wherein the command specifies setting a volume level of the set-top box or of a display coupled to the set-top box.

5. A method according to claim 1, wherein the command specifies setting of a volume level or muting of the volume for the set-top box or a display coupled to the set-top box.

6. A method according to claim 1, wherein the device event includes an incoming call, an outgoing call, an off-hook condition, or an on-hook condition.

7. A method according to claim 1, wherein the predefined header includes,
a transport field specifying transport mechanism used for the communication channel,
a command field identifying a command message; and
a subcommand field specifying information about the command message.

8. A method according to claim 1, wherein the wireless device includes a mobile phone, and the command is generated based on a voice signal received by the mobile phone.

9. An apparatus comprising:
at least one processor; and
at least one memory including computer program code,
the at least one memory and the computer program code configured to, with the at least one processor, cause the apparatus to perform at least the following,
detect, at a set-top box, a wireless device configured to initiate a voice call,
establish, by the set-top box, a communication channel with the wireless device, and
receive, by the set-top box, a command over the communication channel, the command corresponding to a device event experienced by the wireless device,
wherein the detection of the device, the establishment of the channel, and the receipt of the command are according to a communication protocol including a command packet that specifies a predefined header of a fixed length and a payload of variable length, wherein the command includes only the predefined header with a payload length of zero to indicate that the type of packet is a command packet and the command includes a payload length greater than zero to indicate that the type of packet is a data packet.

10. An apparatus according to claim 9, wherein the device event includes a call event, and the apparatus is further caused, at least in part, to:
assign the call event to one or more commands for controlling the set-top box.

11. An apparatus according to claim 9, wherein the apparatus is further caused, at least in part, to:
assign a plurality of the commands to the device event.

12. An apparatus according to claim 9, wherein the command specifies setting a volume level of the set-top box or of a display coupled to the set-top box.

13. An apparatus according to claim 9, wherein the command specifies setting of a volume level or muting of the volume for the set-top box or a display coupled to the set-top box.

14. An apparatus according to claim 9, wherein the device event includes an incoming call, an outgoing call, an off-hook condition, or an on-hook condition.

15. An apparatus according to claim 9, wherein the predefined header includes,
a transport field specifying transport mechanism used for the communication channel,
a command field identifying a command message; and
a subcommand field specifying information about the command message.

16. An apparatus according to claim 9, wherein the wireless device includes a mobile phone, and the command is generated based on a voice signal received by the mobile phone.

17. A method comprising:
detecting a device event, at a wireless device configured to initiate a voice call;
generating a command in response to the detected device event;
establishing a communication channel with a set-top box; and
initiating wireless transmission of the command over the communication channel to the set-top box, wherein the command specifies control of the set-top box,
wherein the steps of detecting, establishing, and initiating are performed according to a communication protocol including a command packet that specifies a predefined header of a fixed length and a payload of variable length, wherein the command includes only the predefined header with a payload length of zero to indicate that the type of packet is a command packet and the command includes a payload length greater than zero to indicate that the type of packet is a data packet.

18. A method according to claim 17, wherein the device event includes a voice command, a call event associated with an incoming call, an outgoing call, an off-hook condition, or an on-hook condition, and the command specifies adjusting a volume level of the set-top or of a display coupled to the set-top box.

19. An apparatus comprising:
at least one processor; and
at least one memory including computer program code,
the at least one memory and the computer program code configured to, with the at least one processor, cause the apparatus to perform at least the following,
detect a device event, at a wireless device configured to initiate a voice call;
generate information about the device event in response to the detection;
establish a communication channel with a set-top box; and
initiate wireless transmission of the command over the communication channel to the set-top box, wherein the command specifies control of the set-top box,
wherein the detection of the device event, the establishment of the channel, and the initiation of the transmission of the command are according to a communication protocol including a command packet that specifies a predefined header of a fixed length and a payload of variable length, wherein the command includes only the predefined header with a payload length of zero to indicate that the type of packet is a command packet and the command includes a payload length greater than zero to indicate that the type of packet is a data packet.

20. An apparatus according to claim 17, wherein the device event includes a voice command, a call event associated with an incoming call, an outgoing call, an off-hook condition, or an on-hook condition, and the command specifies adjusting a volume level of the set-top or of a display coupled to the set-top box.

* * * * *